3,475,430
1,2-DIHYDRO-1,3,5-TRIAZINE ETHERS
Joseph J. Ursprung, Kalamazoo, Mich., assignor to The
  Upjohn Company, Kalamazoo, Mich., a corporation of
  Delaware
No Drawing. Filed Jan. 7, 1966, Ser. No. 519,199
  Int. Cl. C07d 87/40, 55/22; A61k 27/00
U.S. Cl. 260—249.6                                14 Claims

ABSTRACT OF THE DISCLOSURE 1,2-dihydro-1,3,5-triazine ethers can be prepared by reacting the corresponding 1,2-dihydro-1-hydroxy-1,3,5-triazine with an organic halide. These compounds are antihypertensive agents useful for lowering blood pressure and for the treatment of shock.

---

This invention relates to novel dihydrotriazines and to processes for their preparation, and is more particularly concerned with novel 1,3,5-triazine ethers which can be represented by the formula:

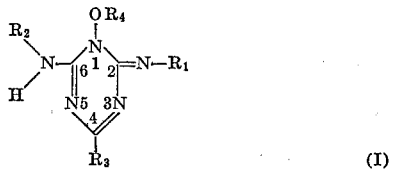

(I)

wherein $R_1$ and $R_2$ are selected from the group consisting of hydrogen and alkyl of 1 to 4 carbon atoms, inclusive; and $R_3$ is selected from the group consisting of di-lower-alkylamino, N-lower-alkyl - lower-alkenylamino, di-lower-alkenylamino, and the heterocyclic moieties, azirdinyl, azetidinyl, pyrrolidinyl, piperidino, hexahyroazepinyl, heptamethylenimino, octamethylenimino, and morpholino, each of said heterocyclic moieties having attached as substituents on carbon atoms thereof zero to 3 alkyls, inclusive, each substituent alkyl being of 1 to 8 carbon atoms, inclusive, the nitrogen atom of $R_3$ being the point of attachment of $R_3$ to the ring in said formula; and $R_4$ is selected from the group consisting of lower alkyl, lower alkenyl, lower alkynyl, lower cycloalkyl, lower aralkyl, lower alkaralkyl, lower alkoxyaralkyl, and lower haloaralkyl. When $R_1$ and $R_2$ are both alkyl, they can be the same or different. When $R_3$ is dialkylamino or dialkenylamino, the alkyls or alkenyls therein can be the same or different. When $R_3$ is a heterocyclic moiety, the alkyls which can be attached thereto can be all different or any two or all of them can be alike. When $R_1$, $R_2$ and/or $R_4$ are alkyl, they can be the same or different than any of the alkyls associated with $R_3$.

Examples of alkyl of 1 to 4 carbon atoms are methyl, ethyl, propyl, butyl, and isomeric forms thereof. Examples of lower alkyl and of alkyl of 1 to 8 carbon atoms are methyl, ethyl, propyl, butyl, pentyl, hexyl, heptyl, octyl, and isomeric forms thereof. Examples of lower alkenyl are allyl, 1-methylallyl, 2-methylallyl (methallyl), 2-butenyl (crotyl), 3-butenyl, 1,2-dimethylallyl, 1,1-dimethylallyl, 2-ethylallyl, 1-methyl-2-butenyl, 2-methyl-2-butenyl, 3-methyl-2-butenyl, 3-pentenyl, 2,3-dimethyl-2-butenyl, 1,1,2-trimethylallyl, 1,3-dimethyl-2-butenyl, 1-ethyl-2-butenyl, 4-methyl-2-pentenyl, 2-ethyl-2-pentenyl, 4,4-dimethyl-2-pentenyl, 2-heptenyl, 2-octenyl, 5-octenyl, 1,4-dimethyl-4-hexenyl, and the like. Examples of lower alkynyl are 2-propynyl (propargyl), 1-methyl-2-propynyl, 2-butynyl, 3-butynyl, 1-methyl - 2 - butynyl, 1-methyl-3-butynyl, 3-pentynyl, 4-pentynyl, 1,2-dimethyl-3-butynyl, 2-methyl-3-pentynyl, 3-hexynyl, and the like. Examples of lower cycloalkyl are cyclopropyl, 2-methylcyclopropyl, 2,2-dimethylcyclopropyl, 2,3-diethylcyclopropyl, 2-butylcyclopropyl, cyclobutyl, 2-methylcyclobutyl, 3-propylcyclobutyl, 2,3,4-triethylcyclobutyl, cyclopentyl, 2,2-dimethylcyclopentyl, 3-pentylcyclopentyl, 3-tert - butylcyclopentyl, cyclohexyl, 4-tert-butylcyclohexyl, 3-isopropylcyclohexyl, 2,2-dimethylcyclohexyl, cycloheptyl, cyclooctyl, and the like. Examples of lower aralkyl are benzyl, phenethyl, 1-phenylethyl, 2-phenylpropyl, 4-phenylbutyl, 6-phenylhexyl, 5-phenyl-2-methylpentyl, 1-naphthylmethyl, 2-(1-naphthyl)ethyl, 2-(2-naphthyl)ethyl, and the like. Examples of lower alkaralkyl are o-tolymethyl, m-tolymethyl, p-tolymethyl, 4-tert-butylphenylmethyl, 2-(p-toly)ethyl, 1-(m-tolyl)ethyl, 3-(o-ethylphenyl)propyl, 4-methyl-1-naphthylmethyl, 6-tert-butyl-2-naphthylmethyl, and the like. Examples of lower alkoxyaralkyl are o-methoxybenzyl, m-methoxybenzyl, p-methoxybenzyl, 2-(m-methoxyphenyl)ethyl, 3-(p-ethoxyphenyl)propyl, 4-(p-tert-butoxyphenyl)butyl, 4-methoxy - 1-naphthylmethyl, and the like. Examples of lower haloaralkyl are o-chlorobenzyl, m-fluorobenzyl, p-bromobenzyl, 2-(m-iodophenyl))ethyl, 2,4-dichlorobenzyl, 6-bromo-1-naphthylmethyl, 4-(p-chlorophenyl)butyl, and the like. Examples of heterocyclic moieties within the scope of $R_3$, in addition to those already mentioned above, are 2-methylaziridinyl,
2-ethylaziridinyl,
2-butylaziridinyl,
2,3-dimethylaziridinyl,
2,2-dimethylaziridinyl,
2-methylazetidinyl,
3-methylazetidinyl,
2-octylazetidinyl,
2,2-dimethylazetidinyl,
3,3-diethylazetidinyl,
2,4,4-trimethylazetidinyl,
2,3,4-trimethylazetidinyl,
2-methylpyrrolidinyl,
3-butylpyrrolidinyl,
2-isohexylpyrrolidinyl,
2,3-dimethylpyrrolidinyl,
2,2-dimethylpyrrolidinyl,
2,5-diethylpyrrolidinyl,
3-tert-butylpyrrolidinyl,
2,3,5-trimethylpyrrolidinyl,
3,4-dioctylpyrrolidinyl,
2-methylpiperidino,
3-methylpiperidino,
4-methylpiperidino,
3-isopropylpiperidino,
4-tert-butylpiperidino,
2-methyl-5-ethylpiperidino,
3,5-dipentylpiperidino,
2,4,6-trimethylpiperidino,
2,6-dimethyl-4-octylpiperidino,
2,3,5-triethylpiperidino,
2-ethylhexahydroazepinyl,
4-tert-butylhexahydroazepinyl,
3-heptylhexahydroazepinyl,
2,4-dimethylhexahydroazepinyl,
3,3-dimethylhexahydroazepinyl,
2,4,6-tripropylhexahydroazepinyl,
2-methylheptamethylenimino,
5-butylheptamethylenimino,
2,4-diisopropylheptamethylenimino,
3,3-diethylheptamethylenimino,
2,5,8-trimethylheptamethylenimino,
3-methyloctamethylenimino,
2,9-diethyloctamethylenimino,
4-isooctyloctamethylenimino,
2-ethylmorpholino,
2-methyl-5-ethylmorpholino, 3,3-dimethylmorpholino,
2,6-di-tert-butylmorpholino, and the like. In each of the above examples of heterocyclic moieties, the free valence, and hence the point of attachment to a carbon atom of the triazine ring, is at the heterocyclic nitrogen atom.

The novel 1,3,5-triazine ethers of Formula I are amines and exist either in the nonprotonated (free base) form or the protonated (acid addition salt) form depending upon the pH of the environment. They form stable protonates (mono- and diacid addition salts) on neutralization with suitable acids, for example, hydrochloric, hydrobromic, sulfuric, phosphoric, nitric, acetic, benzoic, salicylic, glycolic, succinic, nicotinic, tartaric, maleic, malic, pamoic, methanesulfonic, cyclohexanesulfamic, and lactic acids, and like pharmacologically acceptable acids.

The compounds of Formula I are orally and parenterally active in birds and mammals as antihypertensive agents having vasodilatory activity, and are useful for lowering blood pressure and for the treatment of shock. For these purposes, they can be used in the nonprotonated (free base) form or in the protonated (acid addition salt) form in association with a pharmaceutical carrier in solid or liquid dosage forms, such as tablets, capsules, powders, pills, granules, syrups, elixirs, suppositories, sterile aqueous or vegetable oil dispersions for parenteral use, and the like, alone or in combination with other drugs, for example, in combination with diuretics, sympathetic blocking agents, ganglion-blocking agents, peripheral vasodilators, reserpinoids, tranquilizers, sedatives, muscle relaxants, antihistamines and other antihypertensives. The compounds of Formula I can also be used as antisecretory agents and central nervous system depressants.

The novel 1,3,5-triazine ethers of Formula I can also be used for making aminoplast resins by condensation with formaldehyde. The acid addition salts of the dihydrotriazines are also useful for upgrading the corresponding free bases. The dihydrotriazines also form salts with thiocyanic acid which, when condensed with formaldehyde, form resinous materials useful as pickling inhibitors according to U.S. Patents 2,425,320 and 2,606,155. They also form salts with fluosilicic acid which are useful as mothproofing agents according to U.S. Patents 1,915,334 and 2,075,359.

The novel 1,3,5-triazine ethers of Formula I are produced by a process which comprises mixing a 1,2-dihydro-1-hydroxy-1,3,5-triazine of the formula:

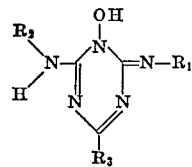

(II)

wherein $R_1$, $R_2$, and $R_3$ are as given above, with an organic halide of the formula $R_4$—X, wherein $R_4$ is as given above and wherein X is selected from the group consisting of chloride, bromide, and iodide.

Organic halides of the formula $R_4$—X, are either known in the art or can be produced by methods known in the art, for example, by reaction of the corresponding alcohol with a phosphorus halide, by halogenation of a suitable saturated hydrocarbon, or by addition of a hydrogen halide to a suitable unsaturated hydrocarbon. It was observed that the organic iodides are usually the most reactive and the organic chlorides the least reactive in the novel process of this invention, the organic bromides usually occupying an intermediate position in that regard. It was also observed that 2-alkenyl (allylic), 2-alkynyl, and benzyl-type halides are usually more reactive than organic halides lacking those structural features. It is preferred that 1-alkenyl (vinyl) and 1-alkynyl halides not be used in the novel process of this invention because of the low reactivity of such halides. Examples of suitable organic bromides are methyl bromide, ethyl bromide, n-propyl bromide, isopropyl bromide, n-butyl bromide, sec-butyl bromide, isobutyl bromide, n-pentyl bromide, isopentyl bromide, 2-methylbutyl bromide, 1,2-dimethylpropyl bromide, 1-ethylpropyl bromide, 1-methylbutyl bromide, n-hexyl bromide, isohexyl bromide, 1-methylpentyl bromide, 1-ethylbutyl bromide, 2-methylpentyl bromide, 1,2-dimethylbutyl bromide, allyl bromide, 2-methylallyl bromide, 2-butenyl bromide, 3-butenyl bromide, 1,2-dimethylallyl bromide, 2-ethylallyl bromide, 1-methyl-2-butenyl bromide, 2-methyl-2-butenyl bromide, 3-methyl-2-butenyl bromide, 2,3-dimethyl-2-butenyl bromide, 1,3-dimethyl-2-butenyl bromide, 1-ethyl-2-butenyl bromide, 4-methyl-2-pentenyl bromide, 2-propynyl bromide, 2-butynyl bromide, 1-methyl-2-propynyl bromide, 3-butynyl bromide, 1-methyl-3-butynyl bromide, 3-pentynyl bromide, 4-pentynyl bromide, 3-hexynyl bromide, 2-methyl-3-pentynyl bromide, cyclopentyl bromide, cyclohexyl bromide, 2-methylcyclopentyl bromide, 2-methylcyclohexyl bromide, 3-methylcyclohexyl bromide, 4-methylcyclohexyl bromide, 2-ethylcyclopentyl bromide, 3-ethylcyclopentyl bromide, 4-ethylcyclohexyl bromide, 3-isopropylcyclopentyl bromide, 2,3-dimethylcyclohexyl bromide, cycloheptyl bromide, cyclooctyl bromide, 4-tert-butylcyclohexyl bromide, cyclononyl bromide, cyclodecyl bromide, benzyl bromide, phenethyl bromide, 2-phenylpropyl bromide, 3-phenylpropyl bromide, 4-phenylbutyl bromide, 1-naphthylmethyl bromide, 2-naphthylmethyl bromide, o-methylbenzyl bromide, m-methylbenzyl bromide, p-methylbenzyl bromide, 2-(p-tolyl)ethyl bromide, 4-methyl-1-naphthylmethyl bromide, 2,4-xylylmethylbromide, o-methoxybenzyl bromide, m-methoxybenzyl bromide, p-methoxybenzyl bromide, 4-methoxy-1-naphthylmethyl bromide, o-chlorobenzyl bromide, m-fluorobenzyl bromide, p-bromobenzyl bromide, and the like. Suitable organic chlorides and iodides are those corresponding to the above bromides.

The 1,2-dihydro-1-hydroxy-1,3,5-triazines of Formula II are prepared by oxidizing a triazine of the formula:

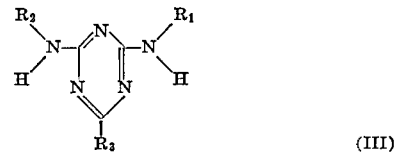

(III)

wherein $R_1$, $R_2$, and $R_3$ are as given above, with a perbenzoic acid of the formula:

(IV)

wherein Y is selected from the group consisting of halogen, lower alkyl, lower alkoxy, and nitro, and $n$ is zero to 5, inclusive.

Unlike the usual tertiary amines, the triazines of Formula III cannot be effectively oxidized to the desired 1,2-dihydro-1-hydroxy-1,3,5-triazines under ordinary conditions with hydrogen peroxide, peracetic acid, or peroxytrifluoroacetic acid. Some anomaly apparently causes these triazines to behave in an atypical manner.

Triazines (melamines) of Formula III are known in the art or can be prepared by methods known in the art [Smolin et al., "s-Triazines and Derivatives," Interscience Publishers Inc., New York, N.Y., pp. 351–71 (1959)]. For example, they can be prepared conveniently from cyanuric chloride (2,4,6-trichloro-1,3,5-triazine) by appropriate replacement of the three chlorines with primary, secondary, and tertiary (including heterocyclic) amino moieties. [Pearlman et al., J. Am. Chem. Soc. 70, 3726–8 (1948); Thurston et al. J. Am. Chem. Soc. 73, 2981–3 (1951); Kaiser et al., J. Am. Chem. Soc. 73, 2984–6

(1951); Detweiler et al., J. Am. Chem. Soc. 74, 1483–5 (1952); Schaefer et al., J. Am. Chem. Soc. 77, 5918–22 (1955); Campbell et al., J. Org. Chem. 26, 2786–9 (1961); Walker et al., J. Am. Pharm. Assoc., Sci. Ed. 39, 393–6 (1950); Kaiser et al., U.S. Patent 2,653,934.] Illustratively, 2-chloro-4,6-diamino-1,3,5-triazine can be prepared by reacting cyanuric chloride with two molecular equivalents of ammonia, and can then be reacted with a secondary amine, $R_3H$, for example, dimethylamine or piperidine, to give a Formula III triazine wherein $R_1$ and $R_2$ are hydrogen and $R_3$ is as given above. Further, 2-amino-4,6-dichloro-1,3,5-triazine can be prepared by reacting cyanuric chloride with one molecular equivalent of ammonia, and can then be reacted successively with a primary alkylamine containing 1 to 4 carbon atoms, for example, ethylamine, and a secondary amine, $R_3H$, for example, dimethylamine or piperidine, to give a Formula III triazine wherein $R_1$ is hydrogen, $R_2$ is alkyl of 1 to 4 carbon atoms, and $R_3$ is as given above. Further, reaction of two molecular equivalents of an appropriate primary amine with cyanuric chloride followed by reaction with a secondary amine will give a Formula III triazine wherein $R_1$ and $R_2$ are both alkyl of 1 to 4 carbon atoms and $R_3$ is as given above. Further, reaction of one molecular equivalent of an appropriate primary amine followed by one molecular equivalent of a different primary amine with cyanuric chloride, followed by reaction with a secondary amine will give a Formula III triazine wherein $R_1$ and $R_2$ are both alkyl of 1 to 4 carbon atoms but are different, and $R_3$ is as given above.

As will be apparent to those skilled in the art, the appropriate amounts of ammonia, primary amine, and secondary amine can be reacted with cyanuric chloride in any order, for example, the order given above, or first, the secondary amine, followed successively by ammonia and a primary amine in either order. Suitable primary amines for this purpose are methylamine, ethylamine, propylamine, isopropylamine, butylamine, and the like. Examples of suitable secondary amines for this purpose are dimethylamine, diethylamine, N-methylethylamine, dipropylamine, N-ethylisopropylamine, di-sec-butylamine, N-methylbutylamine, dipentylamine, N-ethyl-2,4-dimethylpentylamine, N-methyloctylamine, diheptylamine, diallylamine, N-methylallylamine, di-(1-methylallyl)amine, di-(2-methylallyl)amine, N-ethyl-1-methylallylamine, N-propyl-2-ethylallylamine, di-(2-pentenyl)amine, N-methylcyclohexylamine, dicyclohexylamine, N - ethylbenzylamine, dibenzylamine, di(4 - methyl-3-hexenyl)amine, aziridine, 2 - methylaziridine, 2,2 - dimethylaziridine, azetidine, 2 - ethylazetidine, 3 - octylazetidine, 3,3 - dimethylazetidine, 2,2,4 - trimethylazetidine, pyrrolidine, 2 - propylpyrrolidine, 3 - butylpyrrolidine, 2 - isohexylpyrrolidine, 2,3 - dimethylpyrrolidine, 2,2,4 - trimethylpyrrolidine, 2,5 - diethylpyrrolidine, 3,4 - dioctylpyrrolidine, piperidine, 2 - methylpiperidine, 3 - ethylpiperidine, 4 - butylpperidine, 2,4,6 - trimethylpiperidine, 2-methyl-5 - ethylpiperidine, 3,5 - dipentylpiperidine, hexahydroazepine, 2 - ethylhexahydroazepine, 4 - tert-butylhexahydroazepine, 3,3 - dimethylhexahydroazepine, 2,4,6 - tripropylhexahydroazepine, heptamethylenimine, 2 - methylheptamethylenimine, 2,4 - diisopropylheptamethylenimine, octamethylenimine, 4 - isooctyloctamethylenimine, morpholine, 2 ethylmorpholine, 2 - methyl - 5 - ethylmorpholine, 2,6 - dimethylmorpholine, and the like.

Alkylamines, dialkenylamines and alkylalkenylamines are known in the art or can be prepared by methods known in the art. For example, these amines can be prepared by hydrolyzing a substituted cyanamide, prepared as below, or by reacting a lower alkyl halide or lower alkenyl halide with ammonia, lower alkylamine or lower alkenylamine. With ammonia, mono- or di-lower alkylamines or mono- or di-lower alkenylamines are obtained according to whether 1 or 2 molar proportions of the lower alkyl or lower alkenyl halide is used. With primary amines, di-lower alkylamines, di-lower alkenylamines or lower alkylalkenylamines are obtained according to whether the primary amine and the halide is lower alkenyl or lower alkyl. A suitable procedure is set forth in U.S. Patent 2,172,822. Examples of lower alkyl halides are methyl iodide, methyl bromide, ethyl iodide, ethyl chloride, n-propyl bromide, n-propyl chloride, isopropyl bromide, n-butyl bromide, n-butyl chloride, sec-butyl chloride, tert-butyl chloride, and the like. Examples of lower alkenyl halides which can be used include allyl chloride, 1-methylallyl chloride, methallyl choride, 1,1-dimethylallyl chloride, 1,2-dimethylally choride, 2-buteny chloride, 2-ethylallyl chloride, 1-methyl-2-butenyl chloride, 2-methyl-2-butenyl chloride, 3-methyl-2-butenyl chloride, 3-pentenyl chloride, 4-pentenyl chloride, 1,3-dimethyl-2-butenyl chloride, 2,3-dimethyl-2-butenyl chloride, 1,1,2-trimethylallyl chloride, 1-ethyl-2-butenyl chloride, 4-methyl-2-pentenyl chloride, 4-hexenyl chloride, 2-ethyl-2-pentenyl chloride, 4,4-dimethyl-2-pentenyl chloride, 1,5-dimethyl-4-hexenyl chloride, and the corresponding bromides.

Examples of lower alkenylamines which can be used include di-(3-butenyl)amine [Reppe et al., Ann. 596, 80–158 (1955)] and di-(2-methylpropenyl)amine [Seher, Arch. Pharm. 284, 371–82 (1951)], as well as those made by reacting the above lower alkenyl halides with ammonia or a primary amine as described above.

Triazines of Formula III, wherein $R_1$ and $R_2$ are hydrogen can also be prepared by reacting an alkali metal salt of 1,3-dicyanoguanidine with a secondary amine, for example, any of the dialkylamines, dialkenylamines, alkylalkenylamines, and heterocyclic amines included herein [Detweiler et al., J. Am. Chem. Soc. 74, 1483–5 (1952); Nagy, U.S. Patent 2,392,608].

Triazines of Formula III wherein both $R_1$ and $R_2$ are hydrogen can also be prepared by reacting a disubstituted cyanamide [Vliet, Organic Syntheses, coll. vol. 1, 2nd ed., 204 (1948)] with cyanoguanidine (dicyandiamide) [Kaiser, U.S. Patent 2,567,847; Zerweck et al., German Patents 889,593 and 898,591]. For example, a lower alkenyl halide can be reacted with sodium cyanamide, or a secondary amine with cyanogen bromide, to form a disubstituted cyanamide, [Vliet, Organic Syntheses, coll. vol. 1, 2nd ed., 203 (1948); Bull. Chem. Soc. Japan 27, 416–21 (1954)], which in turn can be reacted with dicyandiamide, according to the procedure of U.S. Patent 2,567,847, to form the desired di-lower-alkenylmelamine.

Triazines of Formula III wherein either $R_1$ or $R_2$ is hydrogen and the other is lower alkyl can be prepared by reacting a disubstituted cyanamide described above with a cyanoguanidine (dicyandiamide) substituted with a lower alkyl according to the procedure of U.S. 2,567,847, to form the desired trisubstituted melamine. The dicyandiamides having a lower alkyl can be prepared by reacting a lower alkyl isothiocyanate with sodium cyanamide, methylating to form a cyanoisothiourea and reacting the latter with ammonia [Curd et al., British Patent 599,713; J. Chem. Soc. 1630-6 (1948)].

Perbenzoic acids of Formula IV are known in the art or can be prepared by methods known in the art (Braun, Organic Syntheses, coll. vol. 1, 2nd ed., 431 (1941); Silbert et al., J. Org. Chem. 27, 1336–52 (1962)]. In Formula IV, when $n$ is 2 or more, the Y's can be the same or different. Examples of halogen are fluorine, chlorine, and bromine. Examples of lower alkyl are as given above. Examples of lower alkoxy are methoxy, ethoxy, propoxy, butoxy, pentyloxy, hexyloxy, heptyloxy, octyloxy, and isomeric forms thereof. Suitable oxidizing acids of Formula IV include perbenzoic acid, o-, m-, and p-chloro- and bromoperbenzoic acids, 3,5-dichloroperbenzoic acid, 2,3,5,6-tetrachloroperbenzoic acid, 4-methylperbenzoic acid, 3,4-dimethylperbenzoic acid, pentamethylperbenzoic acid, o-, m-, and p-methoxyperbenzoic acids, 3-nitroperbenzoic acid, 2,4-dinitroperbenzoic acid, 3-chloro-4-methoxyperbenzoic acid, 3-chloro-4-nitroperbenzoic acid, and the like.

In carrying out the reaction between the Formula III triazine and the Formula IV perbenzoic acid, the two reactants are mixed advantageously below about 50° C., preferably between about −10° C. and +10° C., although higher or lower temperatures can be used. It is preferred to mix the reactants in the presence of an inert solvent and to stir the mixture until the reaction is substantially complete. Suitable solvents include N-lower-alkyl-pyrrolidones, e.g., N-methylpyrrolidone; lower alkanols, e.g., methanol, ethanol, propanol, isopropyl alcohol, the butanols, and the pentanols; lower alkanol and glycol esters of lower alkanoic acids, e.g., ethyl acetate, butyl acetate, pentyl acetate, ethylene glycol monoacetate, diethylene glycol monoacetate; ethers, e.g., diethyl ether, diisopropyl ether, ethylene glycol monoethyl ether, diethylene glycol monobutyl ether; and the like. The molecular ratio of Formula III triazine and Formula IV perbenzoic acid can be varied widely. Ratios from about 1:1 to 1:5, preferably from about 1:1.5 to 1:2.5, are suitable.

The 1,2-dihydro-1-hydroxy-1,3,5-triazine of Formula II can be isolated from the oxidation reaction mixture by conventional techniques, for example, by successive evaporation of the reaction solvent at reduced pressure, solution of the basic Formula II product in aqueous acid, e.g., hydrochloric acid, removal of undesired water-insoluble reaction products by filtration, neutralization of the acidic filtrate, and isolation of the Formula II product by filtration, extraction, or chromatography. The isolated material can be purified by conventional techniques, for exampe, by recrystallization from a suitable solvent or pair of solvents, or by preparation of an acid addition salt, e.g., the hydrochloride or acid phosphate, and recrystallization of the salt, followed, if desired, by reconversion of the salt to the free base in the usual manner.

With regard to the production of Formula II dihydrotriazines, the peroxidation step is particularly applicable to the N-oxidation of melamines with lower-2-alkenyl groups since those groups are particularly resistant to epoxidation. The peroxidation process can be used with other lower-alkenylmelamines within the scope of Formula III and not resistant to expoxidation if the double bond is either regenerated or introduced after N-oxidation, or protected before N-oxidation.

When epoxidation does occur, the double bond can be regenerated by methods known in the art, e.g., by the method of Cornforth et al., J. Chem. Soc. 112–27 (1959), which involves treatment of the epoxide with sodium iodide, sodium acetate, and zinc in acetic acid. The reaction

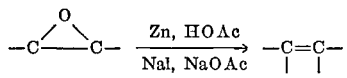

can be conducted in two stages, e.g., treatment of the epoxide with sodium iodide in acetic acid gives the iodohydrin which, in turn, when treated with zinc in acetic acid or stannous chloride in acetic acid gives the olefin.

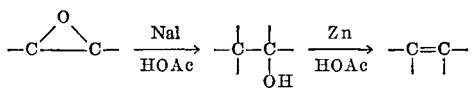

The double bond can be protected by brominating it prior to the oxidation and regenerating it after oxidation by treatment with zinc in a solvent such as ethanol. This in effect is a way of introducing the double bond after the oxidation. Another way of doing this is to start with an N-loweralkylmelamine having a halo group, e.g., bromo, and a lower alkoxy group, e.g., methoxy, on vicinal carbon atoms, N-oxidize as described above, and generate the double bond by treatment with zinc according to the procedure of Dykstra et al., J. Am. Chem. Soc. 52, 3396 (1930). Another method is to start with an N-(lower-hydroxyalkyl)melamine and dehydrate after the N-oxidation with a dehydrating acid by the procedure of Lucas et al., J. Am. Chem. Soc. 57, 723 (1935). Another procedure is to start with an N-lower-alkylmelamine having a halogen and a carboxy group on vicinal carbon atoms, and generate the double bond by treatment with sodium carbonate by the procedure of Young et al., J. Am. Chem. Soc. 51, 2528 (1929). Another method is to start with an N-epoxyalkylmelamine, N-oxidize as described above, and reduce by the method of Cornforth et alk., supra. The starting N-epoxyalkylmelamines can be prepared by substituting the lower-alkenyl halides in the procedures given below by the corresponding epihalohydrins. Examples of such epihalohydrins and methods for the preparation are shown in U.S. Patent 2,061,377. Other methods of protecting carbon-carbon double bonds before peroxidation, or forming or regenerating them after peroxidation will be apparent to those skilled in the art.

The compounds of Formula II wherein $R_3$ is di-lower-alkylamino can also be prepared by hydrogenating a compound of the formula:

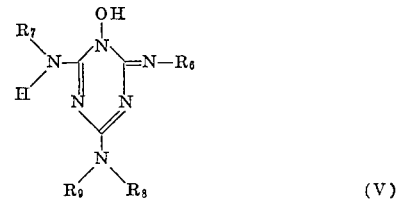

wherein $R_8$ is lower alkenyl, wherein $R_9$ is selected from the group consisting of lower alkyl and lower alkenyl, and wherein $R_6$ and $R_7$ are selected from the group consisting of hydrogen, and alkyl of 1 to 4 carbon atoms, inclusive. In this process, each alkenyl group is transformed to the corresponding alkyl group. The Formula V reactant is not otherwise altered by the hydrogenation. For example, allyl is transformed to propyl; 3-methyl-2-butenyl is transformed to isopentyl. This method cannot, of course, be used to transform an alkenyl to a methyl but only to an alkyl containing as many carbon atoms as are present in the alkenyl, i.e., two or more carbon atoms. Examples of such alkyl are ethyl, propyl, butyl, pentyl, hexyl, heptyl, octyl, and isomeric forms thereof. Examples of lower alkenyl which can be hydrogenated to such alkyl are vinyl, allyl, 2-methylpropenyl, 1-methylallyl, 2-methylallyl (methallyl), 2-butenyl (crotyl), 3-butenyl, 1,2-dimethylallyl, 1,1-dimethylallyl, 2-ethylallyl, 1-methyl-2-butenyl, 2-methyl-2-butenyl, 3-methyl-2-butenyl, 3-pentenyl, 2,3-dimethyl-2-butenyl, 1,1,2-trimethylallyl, 1,3-dimethyl-2-butenyl, 1-ethyl-2-butenyl, 4-methyl-2-pentenyl, 2-ethyl-2-pentenyl, 4,4-dimethyl-2-pentenyl, 1,4-dimethyl-4-hexenyl, and the like.

This hydrogenation of a Formula V dihydrotriazine to a Formula II dihydrotriazine is carried out by mixing the reactant with hydrogen in the presence of a hydrogenation catalyst, for example, a noble metal, e.g., platinum, palladium, rhodium, or a base metal, e.g., Raney nickel, Raney cobalt, and in the presence of an inert solvent, for example, methanol, ethanol, dioxane, ethyl acetate, and the like. Hydrogenation pressures ranging from about atmospheric to about 50 p.s.i., and hydrogenation temperatures ranging from about 10° to about 100° C. are preferred. The Formula II dihydrotriazine can be isolated by conventional techniques, for example, by filtration of the catalyst and evaporation of the solvent, and can be purified as described above.

Still another method of preparing 1,2-dihydro-1-hydroxy-1,3,5-triazines of Formula II, wherein $R_1$ and $R_2$ are hydrogen, starts with the reaction of a cyanoguanidine (dicyandiamide) of the formula $R_3$—C(=NH)NHCN, wherein $R_3$ is as given above, with cyanogen bromide in the presence of a strong base, e.fi., potassium tert-butoxide, to give the salt of the corresponding dicyanoguanidine.

Thereafter, the latter is reacted with a hydroxylamine acid addition salt according to the equation:

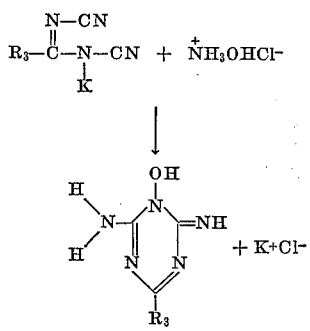

Similarly, 1,2-dihydro-1-hydroxy-1,3,5-triazines of Formula V wherein $R_6$ and $R_7$ are hydrogen can be prepared by reacting cyanoguanidines (dicyandiamides) of the formula

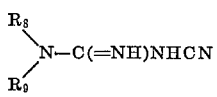

with cyanogen bromide in the presence of a strong base, and then reacting the resulting dicyanoguanidine with a hydroxylamine acid addition salt to give the desired Formula V dihydrotriazine.

To carry out the reaction between the Formula II 1,2-dihydro-1-hydroxy-1,3,5-triazine and the organic halide of the formula $R_4$—X, the two reactants are mixed, preferably in the presence of an inert liquid diluent. When a diluent is used, it is preferred that it be sufficiently inert under the conditions of the reaction to be recoverable substantially unchanged when the reaction is complete, that it dissolve substantial amounts of both reactants, and that it be sufficiently volatile so that it can subsequently be removed from the reaction mixture by distillation. Especially preferred are liquid diluents of moderate to high polarity. Examples of suitable diluents are lower alkanols, e.g., methanol, ethanol, propanol, isopropyl alcohol, the butanols, and the pentanols; lower alkanones, e.g., acetone, methyl ethyl ketone, and diethyl ketone; lower alkanol and glycol esters of lower alkanoic acids, e.g., ethyl acetate, butyl acetate, methyl propionate, ethylene glycol monoacetate, diethylene glycol monoacetate; tertiary amides, e.g., dimethylformamide, N-methylpyrrolidone; dialkyl sulfoxides, e.g., dimethyl sulfoxide; and the like. The amount of diluent is not critical, sufficient preferably being used to give a reaction mixture which initially is homogeneous. Usually it is advantageous to use about one to about 20 parts by weight of diluent per part by weight of the combined reactants.

Although one mole of organic halide is required to react with each mole of Formula II 1,2-dihydro-1-hydroxy-1,3,5-triazine, it is usually advantageous to use an excess of the halide to insure more complete reaction of the more expensive triazine and, in the case of the relatively volatile halides, to insure that at least one mole of the halide is available for each mole of triazine. It is usually satisfactory to use about 1.5 to about 10 moles of halide per mole of triazine although a lesser or greater excess can be used if desired.

It is usually satisfactory to carry out the interaction of organic halide and 1,2-dihydro-1-hydroxy-1,3,5-triazine at about 25° C. The desired reaction can be accelerated by heating but there is usually no reason to heat at a temperature higher than about 150° C.

The time required for reaction between organic halide and 1,2-dihydro-1-hydroxy-1,3,5-triazine will depend on such factors as the specific nature and amounts of the reactants, the reaction temperature, and the nature and amount of diluent, if one is used. It is usually satisfactory to maintain a reaction mixture at about 25° C. for about 12 to about 200 hours. At a higher reaction temperature, for example, about 75° to about 100° C., the necessary reaction time will usually be shorter. It is advantageous in determining the necessary reaction time to make use of the fact that 1,2-dihydro-1-hydroxy-1,3,5-triazines usually change the color of an ethanol solution of ferric chloride to a darker color, often to dark red. The desired 1,3,5-triazine ether does not usually change the color of a ferric chloride solution in that manner. Therefore, the course of the reaction can often be followed by adding a few drops of ethanolic ferric chloride to a small portion of the reaction mixture. When the reaction mixture no longer darkens the ferric chloride solution, the reaction is usually complete.

The reaction between organic halide and 1,2-dihydro-1-hydroxy-1,3,5-triazine usually produces a 1,3,5-triazine ether in the form of an acid addition salt, the acid corresponding to the particular halide used. Thus, use of an organic chloride produces a 1,3,5-triazine ether hydrochloride. These acid addition salts can be isolated and purified by conventional techniques, for example, by evaporation of the diluent and recrystallization of the salt from a suitable solvent or mixture of solvents. If the 1,3,5-triazine ether free base is desired, the purified or unpurified acid addition salt can be mixed with at least one equivalent of a base, preferably in aqueous solution. Suitable bases include ammonia, sodium hydroxide, potassium carbonate, and the like. The resulting free base can then be isolated by conventional techniques, for example by filtration or extraction with an immiscible solvent, followed by evaporation of the solvent from the extract. The free base can be purified also by conventional techniques, for example by recrystallization from a suitable solvent or mixture of solvents or by chromatography.

Other monoacid or diacid addition salts than those obtained directly from the reaction mixture can be produced by neutralization of the 1,3,5-triazine ether with appropriate amounts of the corresponding inorganic or organic acid, examples of which are given above. These transformations can be carried out by a variety of procedures known to the art to be generally useful for the preparation of amine acid addition salts. The choice of the most suitable procedure will depend on a variety of factors including convenience of operation, economic considerations, and particularly the solubility characteristics of the Formula I amine, the acid, and the acid addition salt. If the acid is soluble in water, the basic compound of Formula I can be dissolved in water containing either one or two equivalent amounts of the acid, and thereafter, the water can be removed by evaporation. If the acid is soluble in a relatively nonpolar solvent, for example, diethyl ether or diisopropyl ether, separate solutions of the acid and the basic Formula I compound in such a solvent can be mixed in equivalent amounts, whereupon the acid addition salt will usually precipitate because of its relatively low solubility in the non-polar solvent. Alternatively, the basic Formula I compound can be mixed with the acid in the presence of a solvent of moderate polarity, for example, a lower alkanol, a lower alkanone, or a lower alkyl ester of a lower alkanoic acid. Examples of these solvents are ethanol, acetone, and ethyl acetate, respectively. Subsequent admixture of the resulting solution of acid addition salt with a solvent of relatively low polarity, for example, diethyl ether or hexane, will usually cause precipitation of the acid addition salt. Either monoacid or diacid salts can be formed by using one or two equivalents, respectively, of the acid.

Acid addition salts, for example, those obtained directly by interaction of organic halides and 1,2-dihydro-1-hydroxy-1,3,5-triazines can be transformed to other acid addition salts by a metathetical exchange of the original acid addition salt anion, e.g., the chloride ion, with another anion.

The following preparations and examples illustrate the best method contemplated by the inventor for carrying out his invention.

PREPARATION 1.—1,2 - DIHYDRO-1-HYDROXY-6-AMINO - 4 - DIMETHYLAMINO - 2 - IMINO - 1,3,5-TRIAZINE

A solution of 2,4 - diamino-6-dimethylamino-1,3,5-triazine (5.0 g. 0.032 mole) in 300 ml. of ethylene glycol monomethyl ether at 50° C. was added to a stirred solution of m-chloroperbenzoic acid (11.0 g.; 0.064 mole) in 100 ml. of ethylene glycol monomethyl ether at 5° C. After an initial rise to 30° C., the reaction mixture was cooled to 5° C., stirred for 2 hours, and filtered. The filtrate was evaporated at reduced pressure, the resulting residue was shaken with a solution of 5 ml. of concentrated hydrochloric acid in 50 ml. of water, and the mixture was filtered. The filter cake was washed with 25 ml. of water, and the combined filtrate and washing was adjusted to pH 9 with aqueous sodium hydroxide solution. The 3.2 g. of product which precipitated was filtered and recrystallized from dimethylformamide to give 1.5 g. of 1,2-dihydro-1-hydroxy - 6-amino - 4 - dimethylamino-2-imino-1,3,5-triazine; M.P. 325° C.

Addition of absolute ethanol containing one equivalent of hydrogen chloride to an absolute ethanol solution of 1,2 - dihydro - 1 - hydroxy-6-amino-4-dimethylamino-2-imino - 1,3,5 - triazine, followed by addition of about 4 volumes of diethyl ether, gives the triazine monohydrochloride. Use of 2-equivalents of hydrogen chloride in this procedure gives the dihydro-chloride. Similar use of one equivalent of benzoic acid gives the monobenzoic acid addition salt.

PREPARATION 2

Part A.—1,1-dipropyl-3-cyanoguanidine

A mixture of dipropylamine hydrochloride (13.8 g.; 0.10 mole) and sodium dicyanimide (8.9 g.; 0.10 mole) in 50 ml. of n-butanol was stirred and refluxed for 3 hours. Sodium chloride was then filtered from the reaction mixture, and solvent was removed at reduced pressure. The resulting oily residue solidified when treated with ice water, and was filtered and recrystallized from water to give 13 g. of colorless 1,1 - dipropyl-3-cyanoguanidine; M.P. 83–84° C.

Analysis.—Calcd. for $C_8H_{16}N_4$: C, 57.11; H, 9.59; N, 33.30. Found: C, 57.28; H, 9.05; N, 33.46.

U.V. ($C_2H_5OH$) 227 m$\mu$ ($\epsilon$=19,700); 274 m$\mu$ ($\epsilon$=284).

I.R. (principal bands; mineral oil mull) 3380, 3320, 3210, 1645, 1575, 1510, 1500, 1225, 1200, 1150, 1100, 1075 cm.$^{-1}$.

Part B.—1,2-dihydro-1-hydroxy-6-amino-4-dipropylamino-2-imino-1,3,5-triazine.

Finely-divided potassium tert-butoxide (2.8 g.; 0.025 mole) was added gradually to a solution of 1,1-dipropyl-3-cyanoguanidine (4.2 g.; 0.025 mole) in 50 ml. of dried tetrahydrofuran at 25–30° C. The mixture was refluxed for 5 minutes and then cooled externally to about 5° C. Cyanogen bromide (2.65 g.; 0.025 mole) was added gradually, the reaction temperature rising during the addition to 30° C. The mixture was stirred and allowed to cool to 25° C. during 15 minutes, at which point additional potassium tert-butoxide (2.8 g.; 0.025 mole) was added. After stirring the mixture for an additional 10 minutes, the solvent was removed under reduced pressure and the resulting residue was dissolved in 100 ml. of water. Hydroxylamine hydrochloride (1.74 g.; 0.025 mole) was then added, and the mixture was heated at about 100° C. for 45 minutes, cooled to about 25° C., acidified with dilute hydrochloric acid, and extracted with two 50-ml. portions of chloroform. The aqueous solution was brought to pH 8 with aqueous sodium hydroxide solution and extracted with four 250-ml. portions of chloroform. The combined chloroform extracts were dried and evaporated to a residue which was recrystallized three times from acetonitrile to give 1,2-dihydro-1-hydroxy-6-amino-4-dipropylamino-2-imino-1,3,5-triazine; M.P. 195–197° C.

Analysis.—Calcd. for $C_9H_{18}N_6O$: C, 47.77; H, 8.02. Found: C, 48.11; H, 7.95.

U.V. ($H_2O$) 211 m$\mu$ ($\epsilon$=37,100); 247 m$\mu$ ($\epsilon$=16,600). (0.01 N $H_2SO_4$) 215 m$\mu$ ($\epsilon$=17,900); 239 m$\mu$ ($\epsilon$=22,400). (0.01 N KOH) 247 m$\mu$ ($\epsilon$=16,600).

I.R. (principal bands; mineral oil mull) 3420, 3340, 1675, 1627, 1575, 1555, 1490, 1212, 1102 cm.$^{-1}$.

N.M.R. The nuclear magnetic resonance spectrum of this compound in deuterated dimethyl sulfoxide was observed on a Varian A–60 spectrometer. All signals are given in cycles per second downfield from tetramethylsilane which was arbitrarily set at 0 c.p.s. The propyl groups give a typical pattern; a triplet centered at 41.5 c.p.s. (—CH$_3$), a sextet centered at about 74 c.p.s.

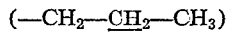

(—CH$_2$—C̲H̲$_2$—CH$_3$)

and a triplet at about 171 c.p.s. (N—C̲H̲$_2$—CH$_2$CH$_3$). Acidic hydrogens (NH and/or OH) appear at 379 c.p.s.

PREPARATION 3.—1,2 - DIHYDRO - 1 - HYDROXY-6 - AMINO - 4 - DIALLYLAMINO - 2 - IMINO - 1,3,5-TRIAZINE

A suspension of 2-diallylamino-4,6-diamino-1,3,5-triazine (57 g.; 0.28 mole) in 1500 ml. of ethanol was stirred and cooled to 5° C. m-chloroperbenzoic acid (96 g.; 0.56 mole) was added over a period of 20 minutes. The resulting solution was stirred at 0–5° C. for 18 hours. The mixture was evaporated to near dryness under vacuum. Water (150 ml.) and concentrated hydrochloric acid (100 ml.) were added. The resulting suspension was filtered and the solid filter cake was washed twice with 50-ml. portions of water. The combined filtrate and washings were adjusted to pH 9 with aqueous 50% sodium hydroxide solution. The solid which separated was removed by filtration and washed with 50 ml. of water. The combined filtrate and washings were extracted with 300-ml. portions of chloroform until 4 l. of chloroform had been used. The chloroform extracts were combined and dried over anhydrous sodium sulfate, and the solvent was evaporated under reduced pressure. The solid residue was recrystallized twice from acetonitrile to give 31 g. of 1,2-dihydro-1-hydroxy-6-amino-4-diallylamino-2-imino-1,3,5-triazine; M.P. 180.5–183.2° C.

Analysis.—Calcd. for $C_9H_{14}N_6O$: C, 48.63; H, 6.35; N, 37.82. Found: C, 48.54; H, 6.17; N, 37.49.

U.V. ($H_2O$) 246 m$\mu$ ($\epsilon$=16,250). (0.01 N $H_2SO_4$) 218 m$\mu$ ($\epsilon$=20,050); 237 m$\mu$ ($\epsilon$=25,150). (0.01 N NaOH) 245 m$\mu$ ($\epsilon$=16,050).

I.R. (principal bands; mineral oil mull) 3438, 3360, 3288, 3070, 3000, 1692, 1667, 1642, 1626, 1620, 1614, 1585, 1548, 1535, 1530, 1523, 1512, 1490, 1407, 1313, 1285, 1202, 932, 912, 767 cm.$^{-1}$.

N.M.R. The nuclear magnetic resonance spectrum, measured on solutions (ca. 0.3 ml. of 0.2 molar) of the sample in deuterated water with a Varian DP–60 spectrometer, calibrated relative to internal water by an audioscillator in conjunction with a frequency counter, showed a complex multiplet of relative area 1 at −90 to −48 c.p.s. ($\beta$-allyl hydrogen), a broad absorption of area 1 at −29 c.p.s. (one of the $\gamma$-allyl hydrogens), two similar multiplets of total area 1 at −18 and −12 c.p.s. (the other $\gamma$-allyl hydrogen), a sharp singlet of area 4 at 0 c.p.s. (exchangeable hydrogens), and a perturbed doublet of area 2 at 39 and 42 c.p.s. ($\alpha$-allyl hydrogens).

Upon neutralization of 1,2-dihydro-1-hydroxy-6-amino-4 - diallylamino - 2 - imino-1,3,5-triazine with an equimolar amount of hydrogen chloride in ethanol, 1,2-dihydro - 1 - hydroxy - 6 - amino-4-diallylamino-2-imino-1,3,5-triazine monohydrochloride is obtained. The dihydrochloride is obtained by using 2 moles of hydrogen chloride per mole of the free base.

Following the procedure of preparation 3 but substituting for the 2-diallylamino-4,6-diamino-1,3,5-triazine,
2-[bis(1-methylallyl)amino]-4,6-diamino-1,3,5-triazine;
2-[bis-(2-butenyl)amino]-4,6-diamino-1,3,5-triazine;

2-[bis(3-butenyl)amino]-4,6-diamino-1,3,5-triazine;
2-[bis(1,2-dimethylallyl)amino]-4,6-diamino-1,3,5-triazine;
2-[bis(1,5-dimethyl-4-hexenyl)amino]-4,6-diamino-1,3,5-triazine;
2,4-bis(methylamino)-6-diallylamino-1,3,5-triazine;
2-amino-4-[bis(1-methylallyl)amino]-6-methylamino-1,3,5-triazine;
2,4-diamino-6-(N-methylallylamino)-1,3,5-triazine;
2,4-bis(ethylamino)-6-(N-ethyl-2-butenylamino)-1,3,5-triazine; and
2,4-bis(allylamino)-6-diallylamino-1,3,5-triazine, there are obtained 1,2-dihydro-1-hydroxy-6-amino-4-[bis(1-methylallyl)-amino]-2-imino-1,3,5-triazine;
1,2-dihydro-1-hydroxy-6-amino-4-[bis(2-butenyl)amino]-2-imino-1,3,5-triazine;
1,2-dihydro-1-hydroxy-6-amino-4-[bis(3-butenyl)amino]-2-imino-1,3,5-triazine;
1,2-dihydro-1-hydroxy-6-amino-4-[bis(1,2-dimethylallyl)amino]-2-imino-1,3,5-triazine;
1,2-dihydro-1-hydroxy-6-amino-4-[bis(1,5-dimethyl-4-hexenyl)amino]-2-imino-1,3,5-triazine;
1,2-dihydro-1-hydroxy-4-diallylamino-6-methylamino-2-methylimino-1,3,5-triazine;
1,2-dihydro-1-hydroxy-4-[bis(1-methylallyl)amino]-2-imino-6-methylamino-1,3,5-triazine;
1,2-dihydro-1-hydroxy-6-amino-2-imino-4-(N-methylallylamino)-1,3,5-triazine;
1,2-dihydro-1-hydroxy-6-ethylamino-4-(N-ethyl-2-butenylamino)-2-ethylimino-1,3,5-triazine; and
1,2-dihydro-1-hydroxy-6-allylamino-2-allylimino-4-diallylamino-1,3,5-triazine, respectively.

Also following the procedure of preparation 3 but substituting for the 2-diallylamino-4,6-diamino-1,3,5-triazine,
2,4-diamino-6-[bis(2-methylpropenyl)amino]-1,3,5-triazine,
2,4-diamino-6-[bis(1,1-dimethylallyl)amino]-1,3,5-triazine,
2,4-diamino-6-[bis(2-ethylallyl)amino]1,3,5-triazine,
2,4-diamino-6-[bis(1-methyl-2-butenyl)amino]-1,3,5-triazine,
2,4-diamino-6-[bis(2-methyl-2-butenyl)amino]-1,3,5-triazine,
2,4-diamino-6-[bis(3-methyl-2-butenyl)amino]-1,3,5-triazine,
2,4-diamino-6-[bis(3-pentenyl)amino]-1,3,5-triazine,
2,4-diamino-6-[bis(2,3-dimethyl-2-butenyl)amino]-1,3,5-triazine,
2,4-diamino-6-[bis(1,1,2-trimethylallyl)amino]-1,3,5-triazine
2,4-diamino-6-[bis(1,3-dimethyl-2-butenyl)amino]-1,3,5-triazine,
2,4-diamino-6-[bis(1-ethyl-2-butenyl)amino]1,3,5-triazine,
2,4-diamino-6-[bis(4-methyl-2-pentenyl)amino]1,3,5-triazine,
2,4-diamino-6-[bis(2-ethyl-2-pentenyl)amino]-1,3,5-triazine, and
2,4-diamino-6-[bis-(4,4-dimethyl-2-pentenyl)amino]-1,3,5-triazine, there are obtained 1,2-dihydro-1-hydroxy-6-amino-4-[bis(2-methylpropenyl)amino]-2-imino-1,3,5-triazine,
1,2-dihydro-1-hydroxy-6-amino-4-[bis(1,1-dimethylallyl)amino]-2-imino-1,3,5-triazine,
1,2-dihydro-1-hydroxy-6-amino-4-[bis(2-ethylallyl)amino]-2-imino-1,3,5-triazine,
1,2-dihydro-1-hydroxy-6-amino-4-[bis(1-(methyl-2-butenyl)amino]-2-imino-1,3,5-triazine,
1,2-dihydro-1-hydroxy-6-amino-4-[bis(2-methyl-2-butenyl)amino]-2-imino,1,3,5-triazine,
1,2-dihydro-1-hydroxy-6-amino-4-[bis(3-methyl-2-butenyl)amino]-2-imino-1,3,5-triazine,
1,2-dihydro-1-hydroxy-6-amino-4-[bis(3-pentenyl)amino]-2-imino-1,3,5-triazine,
1,2-dihydro-1-hydroxy-6-amino-4-[bis(2,3-dimethyl-2-butenyl)amino]-2-imino-1,3,5-triazine,
1,2-dihydro-1-hydroxy-6-amino-4-[bis(1,1,2-trimethylallyl)amino]-2-imino-1,3,5-triazine,
1,2-dihydro-1-hydroxy-6-amino-4-[bis(1,3-dimethyl-2-butenyl)amino]-2-imino-1,3,5-triazine,
1,2-dihydro-1-hydroxy-6-amino-4-[bis(1-ethyl-2-butenyl)amino]-2-imino-1,3,5-triazine,
1,2-dihydro-1-hydroxy-6-amino-4-[bis(4-methyl-2-pentenyl)amino]-2-imino-1,3,5-triazine,
1,2-dihydro-1-hydroxy-6-amino-4-[bis(2-ethyl-2-pentenyl)amino]-2-imino-1,3,5-triazine, and
1,2-dihydro-1-hydroxy-6-amino-4-[bis(4,4-dimethyl-2-pentenyl)amino]-2-imino-1,3,5-triazine, respectively.

PREPARATION 4.—1,2-DIHYDRO-1-HYDROXY - 6-AMINO - 4 - DIPROPYLAMINO-2-IMINO - 1,3,5-TRIAZINE

A solution of 1,2-dihydro-1-hydroxy-6-amino-4-diallyl-amino-2-imino-1,3,5-triazine (2.2 g.; 0.01 mole) in 150 ml. of ethanol was shaken for 30 minutes with hydrogen at 40 lbs. initial pressure in the presence of 10 mg. of finely divided platinum (from platinum oxide). The resulting solution was filtered and evaporated to dryness. The residue was recrystallized four times from acetonitrile to give 1,2-dihydro-1-hydroxy-6-amino - 4 - dipropylamino-2-imino-1,3,5 - triazine; M.P. 190–193° C. This material did not depress the melting point of the material obtained in preparation 2, part B. There were no significant differences in the I.R., U.V., and N.M.R., spectra of these two materials.

*Analysis.*—Calcd. for $C_9H_{18}N_6O$: C, 47.77; H, 8.02; N, 37.14. Found: C, 47.99; H, 8.06; N, 36.33.

U.V. ($H_2O$) 210.5 m$\mu$ ($\epsilon$=36,950); 247 m$\mu$ ($\epsilon$=16,800). (0.01 N HCl) 214 m$\mu$ ($\epsilon$=18,900); 238 m$\mu$ ($\epsilon$=23,150). (0.01 N NaOH) 247 m$\mu$ ($\epsilon$=16,600).

I.R. (principal bands; mineral oil mull) 3420, 3340, 1675, 1627, 1575, 1555, 1490, 1212, 1102 cm.$^{-1}$.

Following the procedure of preparation 4, but substituting for the 1,2 - dihydro-1-hydroxy-6-amino-4-diallyl-amino-2-imino-1,3,5-triazine, each of the first ten 1,2-dihydro-1-hydroxy-1,3,5-triazines listed in preparation 3 in the order listed, there are obtained 1,2-dihydro-1-hydroxy-6-amino-4-di-sec-butylamino-2-imino-1,3,5-triazine;
1,2-dihydro-1-hydroxy-6-amino-4-dibutylamino-2-imino-1,3,5-triazine;
1,2-dihydro-1-hydroxy-6-amino-4-dibutylamino-2-imino-1,3,5-triazine;
1,2-dihydro-1-hydroxy-6-amino-4-[bis(1,2-dimethylpropyl)amino]-2-imino-1,3,5-triazine;
1,2-dihydro-1-hydroxy-6-amino-4-[bis(1,5-dimethylhexyl)amino]-2-imino-1,3,5-triazine;
1,2-dihydro-1-hydroxy-4-dipropylamino-6-methylamino-2-methylimino-1,3,5-triazine;
1,2-dihydro-1-hydroxy-4-di-sec-butylamino-2-imino-6-methylamino-1,3,5-triazine;
1,2-dihydro-1-hydroxy-6-amino-2-imino-4-(N-methyl-propylamino)-1,3,5-triazine;
1,2-dihydro-1-hydroxy-6-ethylamino-4-(N-ethyl-butyl-amino)-2-ethylimino-1,3,5-triazine; and
1,2-dihydro-1-hydroxy-4-dipropylamino-6-propylamino-2-propylimino-1,3,5-triazine, respectively.

PREPARATION 5

*Part A.—2,4-diamino-6-dipropylamino-1,3,5-triazine*

A mixture of 2-diallylamino - 4,6 - diamino-1,3,5-triazine (15.0 g.; 0.072 mole), 200 ml. of methanol, and 0.5 g. of platinum oxide was shaken with hydrogen at 50 lbs. initial pressure for one hour. After addition of about an equal volume of water, the reaction mixture was purged with nitrogen for 2 hours and filtered. The filter cake was washed with water, dissolved in hot ethanol, and filtered. Cooling and filtration gave 10.4 g. of 2,4-diamino - 6 - dipropylamino-1,3,5-triazine; M.P. 195–197° C.

Analysis.—Calcd. for $C_9H_{18}N_6$: C, 51.40; H, 8.62; N, 39.97. Found: C, 51.39; H, 8.38; N, 40.14.

U.V. ($C_2H_5OH$) 241 m$\mu$ ($\epsilon$=27,500).

I.R. (principal bands; mineral oil mull) 3510, 3310, 3200 (sh.), 3130, 1687, 1630, 1577 (sh.), 1570 (sh.), 1550, 1525, 1505, 1485 cm.$^{-1}$.

*Part B.—1,2-dihydro-1-hydroxy-6-amino-4-dipropylamino-2-imino-1,3,5-triazine.*

The procedure of preparation 3 was followed except that 2,4 - diamino - 6 - dipropylamino - 1,3,5-triazine was used in place of 2 - diallylamino - 4,6 - diamino-1-3,5 - triazine. There was obtained 1,2 - dihydro - 1-hydroxy - 6 - amino - 4 - dipropylamino - 2 - imino-1,3,5 - triazine. This material did not depress the melting point of the material obtained in preparation 2, part B or preparation 4. There were no significant differences in the I.R. and U.V. spectra of these three materials.

Addition of absolute ethanol containing one equivalent of hydrogen chloride to an absolute ethanol solution of 1,2 - dihydro - 1 - hydroxy - 6 - amino - 4-dipropylamino-2 - imino - 1,3,5 - triazine, followed by addition of about 4 volumes of diethyl ether, gives the triazine monohydrochloride. Use of 2 equivalents of hydrogen chloride in this procedure gives the dihydrochloride. Similar use of one equivalent of benzoic acid gives the monobenzoic acid addition salt.

PREPARATION 6.—1,2 - DIHYDRO - 1 - HYDROXY-6 - AMINO - 4 - DIBUTYLAMINO - 2 - IMINO-1,3,5 - TRIAZINE

A solution of 2,4 - diamino - 6 - butylamino - 1,3,5-triazine (11.9 g.; 0.05 mole) in 150 ml. of methanol was added to a stirred solution of m - chloroperbenzoic acid (17.2 g.; 0.10 mole) in 50 ml. of methanol at 0° C. After stirring for 5 hours at 5–10° C., the mixture was concentrated at reduced pressure. The residue was shaken with a solution of 10 ml. of concentrated hydrochloric acid in 100 ml. of water, filtered, and washed with 50 ml. of water. The combined filtrate and washing were adjusted to pH 9 with aqueous sodium hydroxide solution. The gum (7.2 g.) which precipitated was separated, dissolved in chloroform, and adsorbed on a 100-g. column of Florisil (60–100 mesh; a magnesium trisilicate; obtained from Floridin Company, Warren, Pa.). After elution of unreacted starting triazine with 2400 ml. of chloroform, elution with 1200 ml. of chloroform containing 5 percent methanol, evaporation of eluate, and recrystallization of the resulting residue from a mixture of ethyl acetate and hexane gave 1.5 g. of 1,2-dihydro-1 - hydroxy - 6 - amino - 4 - dibutylamino - 2 - imino-1,3,5 - triazine; M.P. 148–151° C. (softened at 134° C.).

Analysis.—Calcd. for $C_{11}H_{22}N_6O$: C, 51.94; H, 8.72. Found: C, 51.91; H, 8.37.

U.V. ($H_2O$) 210 m$\mu$($\epsilon$=33,400); 247 m$\mu$($\epsilon$=14,550). (0.01 N $H_2SO_4$) 216 m$\mu$ (sh.) $\epsilon$=17,150);

238 m$\mu$($\epsilon$=20,500)

(0.01 N KOH) 213 m$\mu$($\epsilon$=35,900); 247 m$\mu$($\epsilon$=14,050).

I.R. (principal bands; mineral oil mull) 3305, 3165, 1660, 1615, 1585, 1514, 1500, 763 cm.$^{-1}$.

Following the procedures of preparation 1 or preparation 6 but substituting for the reactant triazine used in those examples, 2,4-diamino-6-(N-methylethylamino)-1,3,5-triazine;
2,4-diamino-6-diethylamino-1,3,5-triazine;
2,4-diamino-6-diisopropylamino-1,3,5-triazine;
2,4-diamino-6-(N-methylpropylamino)-1,3,5-triazine;
2,4-diamino-6-di-sec-butylamino-1,3,5-triazine;
2,4-diamino-6-di-tert-butylamino-1,3,5-triazine;
2,4-diamino-6-(N-ethylbutylamino)-1,3,5-triazine;
2,4-diamino-6-diisopentylamino-1,3,5-triazine;
2,4-diamino-6-dihexylamino-1,3,5-triazine;
2,4-diamino-6-(N-methylheptylamino)-1,3,5-triazine;
2,4-diamino-6-diisooctylamino-1,3,5-triazine;
2-amino-4-dimethylamino-6-methylamino-1,3,5-triazine;
2,4-bis(methylamino)-6-diethylamino-1,3,5-triazine;
2-amino-4-dibutylamino-6-ethylamino-1,3,5-triazine; and
2,4-bis(butylamino)-6-dibutylamino-1,3,5-triazine, there are obtained 1,2-dihydro-1-hydroxy-6-amino-2-imino-4-(N-methylethylamino)-1,3,5-triazine;
1,2-dihydro-1-hydroxy-6-amino-4-diethylamino-2-imino-1,3,5-triazine;
1,2-dihydro-1-hydroxy-6-amino-4-diisopropylamino-2-imino-1,3,5-triazine;
1,2-dihydro-1-hydroxy-6-amino-2-imino-4-(N-methylpropylamino)-1,3,5-triazine;
1,2-dihydro-1-hydroxy-6-amino-4-di-sec-butylamino-2-imino-1,3,5-triazine;
1,2-dihydro-1-hydroxy-6-amino-4-di-tert-butylamino-2-imino-1,3,5-triazine;
1,2-dihydro-1-hydroxy-6-amino-4-(N-ethylbutylamino)-2-imino-1,3,5-triazine;
1,2-dihydro-1-hydroxy-6-amino-4-diisopentylamino-2-imino-1,3,5-triazine;
1,2-dihydro-1-hydroxy-6-amino-4-dihexylamino-2-imino-1,3,5-triazine;
1,2-dihydro-1-hydroxy-6-amino-2-imino-4-(N-methylheptylamino)-1,3,5-triazine;
1,2-dihydro-1-hydroxy-6-amino-4-diisooctylamino-2-imino-1,3,5-triazine;
1,2-dihydro-1-hydroxy-4-dimethylamino-2-imino-6-methylamino-1,3,5-triazine;
1,2-dihydro-1-hydroxy-4-diethylamino-6-methylamino-2-methylimino-1,3,5-triazine;
1,2-dihydro-1-hydroxy-4-dibutylamino-6-ethylamino-2-imino-1,3,5-triazine; and
1,2-dihydro-1-hydroxy-6-butylamino-2-butylamino-4-dibutylamino-1,3,5-triazine, respectively.

PREPARATION 7.—1,2-DIHYDRO - 1 - HYDROXY-6 - AMINO - 2 - IMINO - 4 - (1 - PYRROLIDINYL)-1,3,5-TRIAZINE

A solution of 2,4 - diamino - 6 - (1 - pyrrolidinyl)-1,3,5 - triazine (10.0 g.; 0.055 mole) in 300 ml. of ethylene glycol monomethyl ether was added at 50° C. to a stirred solution of m-chloroperbenzoic acid (9.5 g.; 0.055 mole) in 100 ml. of ethanol at −5° C. After an initial rise to 35° C., the mixture was cooled and stirred at 5° C. for 5 hours. Thereafter, the solvents were evaporated, the residue was shaken with a solution of 10 ml. of concentrated hydrochloric acid in 100 ml. of water, and the mixture was filtered. The filtrate was adjusted to pH 9 with aqueous sodium hydroxide solution, filtered, cooled at 5° C. for 24 hours, and filtered again. The second filter cake was heated with methanol (150 ml.) and filtered. The methanol filtrate was cooled and filtered twice. The combined filter cakes from the methanol filtrations were recrystallized from methanol (30 ml.) to yield 0.7 g. of 1,2 - dihydro - 1 - hydroxy-6 - amino - 2 - imino - 4 - (1 - pyrrolidinyl) - 1,3,5-triazine; M.P. 280–280.5° C. (with decomposition; darkened at 268° C.).

Analysis.—Calcd. for $C_7H_{12}N_6O$: N, 42.84. Found: N, 42.42.

U.V. ($C_2H_5OH$) 238 m$\mu$ (sh.) ($\epsilon$=12,191). (0.01 N $H_2SO_4$) 218 m$\mu$($\epsilon$=19,900); 240 m$\mu$($\epsilon$=24,400). (0.01 N KOH) 202 m$\mu$($\epsilon$=11,500).

I.R. (principal bands; mineral oil mull) 3430, 3360, 3160, 1670, 1630, 1575–1500, 1240, 1195, 1020, 810, 775 cm.$^{-1}$.

Addition of absolute ethanol containing one equivalent of hydrogen chloride to an absolute ethanol solution of 1,2 - dihydro - 1 - hydroxy - 6 - amino - 2 - imino-4- (1 - pyrrolidinyl) - 1,3,5 - triazine followed by addition of about 4 volumes of diethyl ether gives the triazine monohydrochloride. Use of 2 equivalents of hydrogen chloride in this procedure gives the dihydrochloride. Similar use of one molecular amount of phosphoric acid gives the monophosphoric acid addition salt.

PREPARATION 8.—1,2 - DIHYDRO - 1 - HYDROXY- 6 - AMINO - 4 - (1 - AZIRIDINYL) - 2 - IMINO- 1,3,5-TRIAZINE

Following the procedure of preparation 7, 1,2-dihydro- 1 - hydroxy - 6 - amino - 4 - (1 - aziridinyl) - 2 - imino- 1,3,5 - triazine is obtained by oxidation of 2 - (1- aziridinyl) - 4,6 - diamino - 1,3,5-triazine with 2 molecular equivalents of m-chloroperbenzoic acid.

PREPARATION 9.—1,2 - DIHYDRO - 1 - HYDROXY- 6 - AMINO - 2 - IMINO - 4 - PIPERIDINO - 1,3,5- TRIAZINE

A solution of 2,4-diamino-6-piperidino-1,3,5-triazine (6.0 g.; 0.03 mole) in 50 ml. of N-methylpyrrolidone was added in one portion to a stirred solution of m-chloroperbenzoic acid (10.6 g.; 0.06 mole) in 200 ml. of methanol at 0–5° C. After stirring for 6 hours at 0–5° C., the methanol was evaporated at reduced pressure. A solution of 5 ml. of concentrated hydrochloric acid in 125 ml. of water was added to the residue, and the mixture was cooled and filtered. The filter cake was washed with water, and the combined filtrate and washing were adjusted to pH 9 with aqueous sodium hydroxide solution and extracted with one 400-ml. portion and five 250-ml. portions of chloroform. The combined chloroform extracts were dried with sodium sulfate and concentrated. The N-methylpyrrolidone solution which remained was cooled. The 1.8 g. of solid which precipitated was filtered, washed successively with N-methylpyrrolidone and ether, and dried; M.P. 258–260° C. (with decomposition; softened at 230° C.; darkened at 248° C.). Recrystallization from a mixture of ethanol and water gave 1.0 g. of 1,2-dihydro- 1-hydroxy-6-amino-2-imino-4-piperidino - 1,3,5 - triazine; M.P. 278° C. (with decomposition; discolored at 255° C.; darkened at 273° C.).

Analysis.—Calcd. for $C_8H_{14}N_6O$: N, 39.98. Found: N, 39.64.

U.V. ($C_2H_5OH$) 213 m$\mu$ ($\epsilon$=15,600); 249 m$\mu$ ($\epsilon$=16,900). (0.01 N ethanolic $H_2SO_4$) 216 m$\mu$ ($\epsilon$=19,250); 2349 m$\mu$ ($\epsilon$=26,500). (0.01 N ethanolic KOH) 249 m$\mu$ ($\epsilon$=17,150).

I.R. (principal bands; mineral oil mull) 3430, 3360, 1657, 1625, 1588, 1512, 1480, 1198, 1025 cm.$^{-1}$.

Addition of absolute ethanol containing one equivalent of hydrogen chloride to an absolute ethanol solution of 1,2-dihydro-1-hydroxy-6-amino-2-imino-4-piperdino-1,3,5-triazine followed by addition of about 4 volumes of diethyl ether gives the triazine monohydrochloride. Use of 2 equivalents of hydrogen chloride in this procedure gives the dihydrochloride. Similar use of one molecular amount of lactic acid gives the monolactic acid addition salt.

PREPARATION 10

Part A.—2,4-diamino-6-(1-hexahydroazepinyl) 1,3,5-triazine

Hexamethylenimine (39.6 g.; 0.40 mole) was added to a stirred mixture of 2-chloro-4,6-diamino-1,3,5-triazine (58.0 g.; 0.40 mole), sodium hydroxide (16.0 g.; 0.40 mole), and 500 ml. of water. The mixture was refluxed 24 hours, cooled, and filtered. The filter cake was washed with water, dried, reflux about 30 minutes with 1500 ml. of ethanol, and filtered. The ethanol filtrate was cooled to about 25° C., and the solid which precipitated was filtered and dried, giving 26.0 g. of 2,4-diamino-6-(1-hexahydroazepinyl)-1,3,5-triazine; M.P. 240–242.5° C. (softened at 236° C.).

Analysis.—Calcd. for $C_9H_{16}N_6$: C, 51.90; H, 7.74. Found: C, 52.48; H, 7.81.

U.V. ($C_2H_5OH$) 226 m$\mu$(sl. sh.) ($\epsilon$=22,300). (0.01 N $H_2SO_4$) 220 m$\mu$(sh.) $\epsilon$=18,650); 241 m$\mu$ ($\epsilon$=26,600).

I.R. (principal bands; mineral oil mull) 3495, 3320, 3155, 1673, 1625, 1545, 1040 cm.$^{-1}$.

Part B.—1,2-dihydro-1-hydroxy-6-amino-4-(1-hexahydroazepinyl)-2-imino-1,3,5-triazine A solution of 2,4-diamino-6-(1-hexahydroazepinyl- 1,3,5-triazine (15.0 g.; 0.07 mole) in 200 ml. of ethylene glycol monomethyl ether was added at 50° C. to a stirred solution of m-chloroperbenzoic acid (17.2 g.; 0.10 mole) in 200 ml. of ethanol at −5° C. After stirring at 10–15° C. for 3 hours, the mixture was concentrated at reduced pressure. The residue was shaken with a solution of 20 ml. of centrated hydrochloric acid in 100 ml. of water, filtered and washed with water. The combined filtrate and washing were adjusted to pH 9 with aqueous sodium hydroxide solution, and the solid which precipitates was dissolved in chloroform and adsorbed on a 225-g. column of silica (50–100 mesh). After elution of unreacted starting triazine with 3000 ml. of chloroform containing 10 percent methanol, elution was continued first with 6000 ml. of chloroform containing 40 percent methanol, and then with 6000 ml. of methanol. Solvent was removed from the latter two eluates, and the combined residues upon crystallization from a mixture of n-butanol and diethyl ether gave 1,2-dihydro-1-hydroxy-6-amino-4-(1- hexahydroazepinyl)-2-imino-1,3,5-triazine; M.P. 196° C. (with effervescence; softened at 171° C.).

U.V. ($C_2H_5OH$) 244 m$\mu$(sl. sh.) ($\epsilon$=8556); 268 m$\mu$ (sl. sh.) ($\epsilon$=3250), (0.01 N $H_2SO_4$) 215 m$\mu$ ($\epsilon$=20,657); 234 m$\mu$ ($\epsilon$=17,470). (0.01 N KOH) 244 m$\mu$(sl. sh.) ($\epsilon$=8445); 272 m$\mu$(sh.) ($\epsilon$=2692).

I.R. (principal bands; mineral oil mull) 3340, 3225, 1592, 1549 cm.$^{-1}$.

PREPARATION 11

Part A.—2-(1-azetidinyl)-4,6-diamino-1,3,5-triazine

Following the procedure of preparation 10, part A, 2- chloro-4,6-diamino-1,3,5-triazine is reacted with azetidine, yielding 2-(1-azetidinyl)-4,6-diamino-1,3,5-triazine.

Part B.—1,2-dihydro-1-hydroxy-6-amino-4- (1-azetidinyl)-2-imino-1,3,5-triazine

Following the procedure of preparation 10, part B, 1,2-dihydrol-1-hydroxy - 6 - amino - 4 - (1-azetidinyl)-2- imino-1,3,5-triazine is obtained by oxidizing 2-(1-azetidinyl)-4,6-diamino-1,3,5-triazine with 2 molecular equivalents of m-chloroperbenzoic acid.

PREPARATION 12

Part A.—2,4-diamino-6-(heptamethyl-enimino)-1,3,5-triazine

Following the procedure of preparation 10, part A, 2- chloro-4,6-diamino-1,3,5-triazine is reacted with heptamethylenimine, yielding 2,4 - diamino-6-(1-heptamethylenimino)-1,3,5-triazine.

Part B.—1,2-dihydro-1-hydroxy-6-amino-4-(1-heptamethyleneimino)-2-imino-1,3,5-triazine Following the procedure of preparation 10, part B, 1,2 - dihydro - 1 - hydroxy-6-amino-4-(1-heptamethylenimino)-2-imino-1,3,5-triazine is obtained by oxidizing 2,4-diamino-6-(1-heptamethylenimino)-1,3,5-triazine with 2 molecular equivalents of m-chloroperbenzoic acid.

PREPARATION 13

*Part A.—2,4-diamino-6-(1-octamethylenimino) 1,3,5-triazine*

Following the procedure of preparation 10, part A, 2-chloro-4,6-diamino-1,3,5-triazine is reacted with octamethylenimine, yielding 2,4-diamino-6-(1-octamethylenimino)-1,3,5-triazine.

*Part B.—1,2-dihydro-1-hydroxy-6-amino-4-(1-octamethylenimino)-2-imino-1,3,5-triazine*

Following the procedure of preparation 10, part B, 1,2 - dihydro - 1 - hydroxy-6-amino-4-(1-octamethylenimino)-2-imino-1,3,5-triazine is obtained by oxidizing 2,4-diamino-6-(1-octamethylenimino) - 1,3,5-triazine with 2 molecular equivalents of m-chloroperbenzoic acid.

PREPARATION 14

*Part A.—2,4-diamino-6-(2,6-dimethylmorpholino) 1,3,5-triazine*

A mixture of 2-chloro-4,6-diamino-1,3,5-triazine (36.2 g.; 0.25 mole), 2,6-dimethylmorpholine (29.0 g.; 0.25 mole), sodium bicarbonate (21.0 g.; 0.25 mole), and 200 ml. of butanol was refluxed for 7 hours. An additional 1600 ml. of butanol was then added, and the mixture was heated to the reflux temperature and filtered. The filtrate was cooled to about 0° C., and the solid which precipitated was filtered and recrystallized from methanol to give 35.0 g. of the methanolate of 2,4-diamino-6-(2,6-dimethylmorpholino)-1,3,5-triazine; M.P. 205–207.5° C.

*Analysis.*—Calcd. for $C_{10}H_{20}N_6O_2$: C, 46.81; H, 7.82; N, 32.79. Found: C, 46.78; H, 7.56; N, 32.56.

U.V. (ethanolic $H_2SO_4$) 220 m$\mu$(sh.) ($\epsilon$=16,530); 242 m$\mu$($\epsilon$=27,150).

I.R. (principal bands; mineral oil mull) 3380, 3310, 3210, 3170, 3020, 2990, 2760, 2530, 1650, 1632, 1562, 1545, 1510, 1483, 1280, 1165, 1135, 1080, 1020 cm.$^{-1}$.

*Part B.—1,2-dihydro-1-hydroxy-6-amino-4-(2,6-dimethylmorpholino)-2-imino-1,3,5-triazine*

A solution of 2,4-diamino-6-(2,6-dimethylmorpholino)-1,3,5-triazine (4.6 g.; 0.02 mole) in 100 ml. of chloroform was added dropwise during one hour to a stirred solution of m-chloroperbenzoic acid (6.9 g.; 0.04 mole) in 100 ml. of ethanol at 0° C. After stirring at 0–5° C. for 5 hours and standing at 25° C. for 15 hours, the solvent was evaporated, and the residue was shaken for 1 hour with a solution of 5 ml. of concentrated hydrochloric acid in 50 ml. of water. The mixture was filtered, and the filtrate was adjusted to pH 9 with aqueous sodium hydroxide solution and extracted with four 200-ml. portions of chloroform. Removal of the chloroform from the combined extracts and two crystallizations of the residue from acetonitrile gave 0.4 g. of 1,2-dihydro-1-hydroxy-6-amino-4-(2,6-dimethylmorpholino) - 2 - imino-1,3,5-triazine; M.P. 251–252° C. (with decomposition; sintered at 248° C.). Additional product (0.5 g.) with the same melting point was obtained from the alkaline aqueous solution by addition of one-fifth volume of methanol, reextraction with chloroform, and crystallization of the extracted material with acetonitrile.

*Analysis.*—Calcd. for $C_9H_{16}N_6O_2$: C, 44.98; H, 6.71. Found: C, 44.47; H, 6.23.

U.V. ($H_2O$) 212 m$\mu$($\epsilon$=38,850); 247 m$\mu$($\epsilon$=16,500). (0.01 N $H_2SO_4$) 218 m$\mu$($\epsilon$=19,400); 239 m$\mu$($\epsilon$=25,300). (0.01 N KOH) 247 m$\mu$($\epsilon$=16,450).

I.R. (principal bands; mineral oil mull) 3510, 3340, 3280, 1690, 1660, 1600, 1525, 1495, 1205, 1170, 1150, 1080, 765, 760 cm.$^{-1}$.

A solution of 1,2-dihydro-1-hydroxy-6-amino-4-(2,6-dimethylmorpholino)-2-imino-1,3,5-triazine in water containing one equivalent of hydrochloric acid (about 1% hydrochloric acid) gives the monohydrochloride when evaporated to dryness. Similar use of 2 equivalents of hydrochloric acid gives the dihydrochloride. Similar use of one molecular amount of sulfuric acid gives the monosulfuric acid addition salt.

PREPARATION 15

*Part A.—2,4-diamino-6-morpholino-1,3,5-triazine*

Following the procedure of preparation 14, part A, 2-chloro-4,6-diamino-1,3,5-triazine is reacted with morpholine, yielding 2,4-diamino-6-morpholino-1,3,5-triazine.

*Part B.—1,2-dihydro-1-hydroxy-6-amino-2-imino-4-morpholino-1,3,5-triazine*

Following the procedure of preparation 14, part B, 1,2-dihydro - 1 - hydroxy - 6 - amino - 2 - imino - 4 - morpholino-1,3,5-triazine is obtained by oxidizing 2,4-diamino-6-morpholino-1,3,5-triazine with 2 molecular equivalents of m-chloroperbenzoic acid.

PREPARATION 16

*Part A.—2,4-bis(methylamino)-6-piperidino-1,3,5-triazine*

Finely-divided cyanuric chloride (46 g.; 0.25 mole) was added gradually during 1 hour to a stirred solution of 40% aqueous methylamine (46 ml.) in 350 ml. of acetone at −50° C. The temperature was kept below −30° C. during the addition. After stirring for an additional hour at −20° C., the reaction temperature was allowed to rise to +25° C., sodium hydroxide (6.0 g.; 0.15 mole) was added, and the mixture was refluxed for 20 hours. The solid which precipitated was filtered, washed with water, and mixed with 350 ml. of dimethylformamide and 30 ml. of piperidine. This mixture was heated at about 100° C. for 18 hours, and was then cooled, diluted with about two volumes of water, and made alkaline by addition of aqueous sodium hydroxide solution. The resulting mixture was extracted with diethyl ether. The ether extract was dried with potassium carbonate and evaporated. The residue was recrystallized twice from hexane to give 26.0 g. of 2,4-bis(methylamino)-6-piperidino-1,3,5-triazine; M.P. 111–112° C.

U.V. ($C_2H_5OH$) 218 m$\mu$($\epsilon$=4100).

I.R. (principal bands; mineral oil mull) 3435, 3260, 3195, 3110, 1613, 1575, 1495, 1285, 1255, 1107, 800 cm.$^{-1}$.

*Part B.—1,2-dihydro-1-hydroxy-6-methylamino-2-methylimino-4-piperidino-1,3,5-triazine*

A solution of 2,4-bis(methylamino)-6-piperidino-1,3,5-triazine (8.9 g.; 0.04 mole) in 55 ml. of ethanol was added during 30 minutes to a solution of m-chloroperbenzoic acid (28.5 g.; 0.15 mole) in 200 ml. of ethanol at −5° C. The temperature rose to 50° C. during the addition. Ethanol was then removed from the reaction mixture under reduced pressure. The residue was shaken with a solution of 10 ml. of concentrated hydrochloric acid in 150 ml. of water, and filtered. The filtrate was adjusted to pH 4.9, and the solid which precipitated was filtered. This solid was twice dissolved in dilute hydrochloric acid, each time thereafter the acid solution being brought to pH 4.9 and filtered. The final solid was then dissolved in chloroform. The pH 4.9 water solutions were also extracted with chloroform. The chloroform solution and extracts were combined, dried with sodium sulfate, and evaporated. The resinous residue was refluxed with 50 ml. of acetonitrile and decolorizing carbon, and filtered. Cooling of the filtrate caused precipitation of 2.2 g. of a solid with an indefinite melting point. The filtrate was adsorbed on a column of Florisil (60–100 mesh) and eluted with chloroform in two 100-ml. fractions. Both eluates were evaporated to give solids. Solid from the first eluate melted at 218–219° C. Solid from the second eluate was 1,2 - dihydro - 1 - hydroxy - 6 - methylamino - 2- methylamino - 4 - piperidino - 1,3,5 - triazine; M.P. 227–230° C.

U.V. ($C_2H_5OH$) 221 m$\mu$ ($\epsilon$=36,890); 250 m$\mu$ ($\epsilon$=14,750). (0.01 N $H_2SO_4$) 245 m$\mu$ ($\epsilon$=27,610); 284 m$\mu$ (sl. sh.) ($\epsilon$=1190). (0.01 N KOH) 220 m$\mu$ ($\epsilon$=37,840); 251 m$\mu$ ($\epsilon$=14,280).

I.R. (principal bands; mineral oil mull) 3330, 3240, 1650, 1595, 1525, 1495, 1289, 1045, 752 cm.$^{-1}$.

N.M.R. The nuclear magnetic resonance spectrum of this compound in deuterochloroform solution was observed on a Varian A–60 spectrometer. All signals are given in cycles per second downfield from tetramethylsilane which was arbitrarily set at 0 c.p.s. The piperidino group gives typical absorption at 94 c.p.s. (—$CH_2$—$CH_2$—$CH_2$—; area 6H) and at 227 c.p.s. (N—$CH_2$—; area 4H). The N—$CH_3$ group shows a singlet at 182 c.p.s., area 6H, and the acidic hydrogens (OH or NH) absorb at 439 c.p.s., area 2H.

Following the procedures of preparation 1; preparation 5, part B; preparation 7; preparation 9; or preparation 14, part B, the mono- and diacid addition salts of 1,2-dihydro - 1 - hydroxy-6-methylamino-2-methylimino-4-piperidino-1,3,5-triazine with hydrochloric acid, sulfuric acid, phosphoric acid, lactic acid, benzoic acid, and succinic acid are prepared.

Following the procedures of any of preparations 7, 9, 10B, 14B, or 16B, but substituting for the reactant triazines used in those preparations 2,4-diamino-6-(2-methyl-1-pyrrolidinyl)-1,3,5-triazine; 2,4 - diamino - 6 - (3-butyl-1-pyrrolidinyl) - 1,3,5 - triazine; 2,4 - diamino-6-(2,5 - diethyl - 1 - pyrrolidinyl) - 1,3,5 - triazine; 2,4-diamino - 6 - (4 - octylpiperidino) - 1,3,5 - triazine; 2,4-diamino - 6 - (5 - ethyl - 2 - methylpiperidino) - 1,3,5-triazine; 2,4 - diamino - 6 - (2,4,6 - trimethylpiperidino)-1,3,5 - triazine; 2,4 - diamino - 6 - (3,3 - diethyl - 1-hexahydroazepinyl) - 1,3,5 - triazine; 2,4 - diamino - 6-(3 - ethylmorpholino) - 1,3,5 - triazine; 2 - (1 - aziridinyl) - 4,6 - bis - (methylamino) - 1,3,5 - triazine; 2-amino - 4 - butylamino - 6 - (1 - pyrrolidinyl) - 1,3,5-triazine; 2,4 - bis(ethylamino) - piperidino - 1,3,5 - triazine; and 2,4 - bis(propylamino) - 6 - morpholino-1,3,5 - triazine, there are obtained 1,2 - dihydro - 1 - hydroxy - 6 - amino - 2 - imino - 4 - (2 - methyl - 1 - pyrrolidinyl) - 1,3,5 - triazine; 1,2 - dihydro - 1 - hydroxy-6 - amino - 4 - (3 - butyl - 1 - pyrrolidinyl) - 2 - imino-1,3,5 - triazine; 1,2 - dihydro - 1 - hydroxy - 6 - amino-4 - (2,5 - diethyl - 1 - pyrrolidinyl) - 2 - imino - 1,3,5-triazine; 1,2 - dihydro - 1 - hydroxy-6-amino-2-imino-4-(4 - octylpiperidino) - 1,3,5 - triazine; 1,2 - dihydro - 1-hydroxy - 6 - amino - 4 - (5 - ethyl - 2 - methylpiperidino) - 2 - imino - 1,3,5 - triazine; 1,2 - dihydro - 1 - hydroxy - 6 - amino - 2 - imino - 4 - (2,4,6-trimethylpiperidino) - 1,3,5 - triazine; 1,2 - dihydro - 1 - hydroxy - 6-amino - 4 - (3,3 - diethyl - 1 - hexahydroazepinyl) - 2-imino - 1,3,5 - triazine; 1,2 - dihydro - 1 - hydroxy - 6-amino - 4 - (3 - ethylmorpholino) - 2 - imino - 1,3,5-triazine; 1,2-dihydro-1-hydroxy-4-(1-aziridinyl)-6-methylamino - 6 - methylimino - 1,3,5 - triazine; 1,2-dihydro-1 - hydroxy - 6 - butylamino - 4 - (1 - pyrrolidinyl) - 2-imino - 1,3,5 - triazine; 1,2 - dihydro - 1 - hydroxy - 6-ethylamino - 2 - ethylimino - 4 - piperidino - 1,3,5 - triazine; and 1,2 - dihydro - 1 - hydroxy - 4 - morpholino-6 - propylamino - 2 - propylimino - 1,3,5 - triazine, respectively.

PREPARATION 17.—1,2-DIHYDRO - 1 - HYDROXY-6 - AMINO - 4 - DIBENZYLAMINO-2-IMINO-1,3,5-TRIAZINE

A solution of 2,4 - diamino - 6 - dibenzylamino - 1,3,5-triazine (6,1 g.; 0.02 mole) in 45 ml. of N-methylpyrrolidone was added during one hour to a stirred solution of m-chloroperbenzoic acid (6.9 g.; 0.04 mole) in 100 ml. of ethanol at 0° C. Stirring was continued for an additional 6 hours at 0–5° C. The solution was then evaporated under reduced pressure at about 100° C. The resulting residue was diluted to about 400 ml. with water, and sodium hydroxide (2.0 g.) in 10 ml. of water was added. This mixture was shaken until a suspension of fine solid developed. The solid was filtered, washed with water, and dissolved in about 50 ml. of hot ethanol. The solid which precipitated on cooling was filtered and recrystallized successively from a mixture of ethanol and water, water, and acetonitrile to give 1.3 g. of 1,2-dihydro-1- hydroxy - 6 - amino-4-dibenzylamino-2-imino-1,3,5-triazine; M.P. 251–252° C.

Analysis.—Calcd. for $C_{17}H_{18}N_6O$: N, 26.07. Found: N, 25.79.

U.V. ($C_2H_5OH$) 247 m$\mu$ ($\epsilon$=17,200); 268 m$\mu$ (sl. fl.) ($\epsilon$=9950). (0.01 N $H_2SO_4$) 240 m$\mu$ ($\epsilon$=21,850). (0.01 N KOH) 248 m$\mu$ ($\epsilon$=17,000); 269 m$\mu$ (sl. fl.) ($\epsilon$=9850).

I.R. (principal bands; mineral oil mull) 3420, 3305, 3020, 1665, 1618, 1585, 1513, 1491, 1193, 1075, 1028, 770, 762 cm.$^{-1}$.

PREPARATION 18

*Part A.—2-chloro-4-methylamino-6-piperidino-1,3,5-triazine*

A solution of cyanuric chloride (36.9 g.; 0.20 mole) in 80 ml. of acetone at about 50° C. was poured slowly into 160 ml. of water at about 0° C. To the resulting slurry at 0–5° C. was added dropwise 40% aqueous methylamine (15.6 g.; 0.20 mole) followed by a solution of sodium hydroxide (8.0 g.; 0.20 mole) in 20 ml. of water. The resulting thick slurry was diluted with 200 ml. of water and stirred at 0° C. for one hour. The reaction mixture was then allowed to warm during dropwise addition of piperidine (17.0 g.; 0.20 mole) followed by dropwise addition of a solution of sodium hydroxide (8.0 g.; 0.20 mole) in 20 ml. of water. An additional 200 ml. of water was added and the resulting mixture was stirred at 50–55° C. for 6 hours. It was then cooled and poured into 2000 ml. of water at 0° C. The solid (32.5 g.) was filtered, washed with water, and dried; M.P. 153–205° C. A portion of this was recrystallized from hexane to give 2-chloro-4-methylamino-6-piperidino-1,3,5-triazine; M.P. 160–163° C.

Analysis.—Calcd. for $C_9H_{14}ClN_5$: C, 47.47; H, 6.20; Cl, 15.57; N, 30.76. Found: C, 47.80; H, 5.98; Cl, 15.87; N, 30.02.

U.V. (isoöctane) 227.5 m$\mu$ ($\epsilon$=27,050); 263 m$\mu$ ($\epsilon$=4000).

I.R. (principal bands; mineral oil mull) 3270, 1625. 1585, 1552, 1495, 1240, 1228, 1057 cm.$^{-1}$.

*Part B.—2,4-dipiperidino-6-methylamino-1,3,5-triazine.*

A slurry of 2-chloro-4-methylamino-6-piperino-1,3,5-triazine (32.5 g.; 0.14 mole) in 200 ml. of n-butanol was stirred and heated externally with oil. When the oil temperature reached 55° C., piperidine (11.9 g.; 0.14 mole) was added rapidly. Heating and stirring were continued until the oil temperature reached 95° C. A solution of sodium hydroxide (5.6 g.; 0.14 mole) in 30 ml. of water was then added dropwise. The mixture was stirred and heated for an additional 4 hours at 90–95° C., and then cooled to 20° C. The aqueous layer was separated, and the organic (butanol) layer was washed with water and allowed to stand at about 25° C. for 15 hours. The 1.0 g. of starting triazine which precipitated was filtered, and solvent was removed from the filtrate by reduced pressure distillation. The resulting residue was recrystallized from hexane to give 32.5 g. of solid; M.P. 105–115° C. Two additional recrystallizations of this solid from hexane gave 2,4 - dipiperidino - 6-methylamino-1,3,5-triazine contaminated with some starting triazine; M.P. 110–118° C.

Analysis.—Calcd. for $C_{14}H_{24}N_6$: C, 60.84; H, 8.75; N, 30.41. Found: C, 60.20; H, 8.27; N, 30.35.

U.V. ($C_2H_5OH$) 229 m$\mu$ ($\epsilon$=45,100); 272 m$\mu$ (sh.) ($\epsilon$=1,150).

I.R. (principal bands; mineral oil mull) 3340, 3260, 1625, 1575, 1525, 1235, 1123, 1085, 1047, 1023 cm.$^{-1}$.

Part C.—1,2-dihydro-1-hydroxy-4,6-dipiperidino-2-methylimino-1,3,5-triazine

Finely-divided m-chloroperbenzoic acid (11.2 g. of 91.5% pure acid; corresponding to 0.06 mole) was added slowly to a stirred suspension of 2,4-dipiperidino-6-methylamino-1,3,5-triazine (8.3 g.; 0.03 mole) in a mixture of 150 ml. of methanol and 50 ml. of absolute ethanol at 5° C. The reaction mixture was stirred for 7 hours at 0–5° C. and then for 15 hours at about 25° C. The solvents were then evaporated, and the residue was triturated with a solution of sodium hydroxide (2.4 g.; 0.06 mole) in 100 ml. of water. The resulting turbid solution was extracted with five 50-ml. portions of chloroform. The combined chloroform extracts were dried with sodium sulfate and evaporated to give a residue which was twice more treated as above with aqueous sodium hydroxide and chloroform. The final chloroform-soluble residue, a viscous oil, was crystallized from acetonitrile to give 1,2-dihydro - 1 - hydroxy-4,6-dipiperidino-2-methylimino-1,3,5-triazine as a tan solid; M.P. 150–160° C. (with decomposition; sintered at 135° C.).

U.V. ($C_2H_5OH$) 231 m$\mu$ ($\epsilon$=30,250); 264 m$\mu$ (sh) ($\epsilon$=9,550). (0.01 N alc. $H_2SO_4$) 237 m$\mu$ ($\epsilon$25,750). (0.01 N alc. KOH) 227 m$\mu$ ($\epsilon$=28,900); 256 m$\mu$ (sh.) ($\epsilon$=11,950).

I.R. (principal bands; mineral oil mull) 3280, 1625, 1570, 1530, 1492, 1250 cm.$^{-1}$.

PREPARATION 19.— 1,2-DIHYDRO-1-HYDROXY-6 - AMINO-4-DIMETHALLYLAMINO-2-IMINO-1,3, 5-TRIAZINE.

m-Chloroperbenzoic acid (6.9 g.; 0.04 mole) was dissolved in 150 ml. of 95% ethanol at —5° C. 2,4-Diamino-6-dimethallylamino-1,3,5-triazine (4.6 g.; 0.02 mole) was added in portions over a period of 1 hr. to the stirred solution held at —5° to 0° C. The mixture was stirred at 0–5° C. for 5 hours, then allowed to come to room temperature (25° C.).

The reaction mixture was concentrated to a syrup at reduced pressure and the syrup was mixed with 50 ml. of water. Concentrated hydrochloric acid (5 ml.) was added and the mixture was shaken for 1 hour. Solid material was removed by filtration and washed with 15 ml. of water. The combined filtrate and washings were adjusted to pH 9. The mixture was extracted three times with 100-ml. portions of chloroform. The combined chloroform extracts were dried over anhydrous sodium sulfate, then evaporated under reduced pressure. The residue was dissolved in acetonitrile and diluted with ether; 1 g. of material, M.P. 148–165° C., was recovered by filtration. The filtrate was concentrated to give 1 g. of material, M.P. 174–177° C. The latter fraction was recrystallized from ethyl acetate to give 0.7 g. of 1,2-dihydro-1-hydroxy-6-amino - 4 - dimethallylamino-2-imino-1,3,5-triazine, M.P. 175–176° C.

Analysis.—Calcd. for $C_{11}H_{18}N_6O \cdot 1/3H_2O$: C, 51.54; H, 7.25; N, 32.79; O, 8.31. Found: C, 51.76; H, 7.74; N, 3155; O, 8.27.

U.V. ($H_2O$) 246 m$\mu$ ($\epsilon$=15,000) (0.01 N $H_2SO_4$) 237 m$\mu$ ($\epsilon$=29,600). (0.01 N NaOH) 246 m$\mu$ ($\epsilon$=15,000).

I.R. (principal bands; mineral oil mull) 3330, 3220, 3065, 1672, 1625, 1592, 1525, 1485, 1190, 1148, 1003, 790, 770 cm.$^{-1}$.

Upon neutralization of 1,2-dihydro-1-hydroxy-6-amino-4-dimethallylamino-2-imino-1,3,5-triazine with an equimolar amount of hydrogen chloride in ethanol, 1,2-dihydro-1-hydroxy-6-amino-4-dimethallylamino-2-imino-1,3,5-triazine monohydrochloride is formed. The dihydrochloride is obtained by using 2 moles of hydrogen chloride per mole of the free base.

PREPARATION 20.—1,2-DIHYDRO-1-HYDROXY-6-AMINO - 4 - (N-ETHYLMETHALLYLAMINO)-2-IMINO-1,3,5-TRIAZINE.

A suspension of 27.2 g. of 2,4-diamino-6-(N-ethylmethallylamino)-1,3,5-triazine (0.14 mole) in 750 ml. ethanol was stirred and cooled to 5° C. m-Chloroperbenzoic acid (48.3 g.; 0.28 mole) was added over a period of 20 minutes. The resulting solution was stirred at 0–5° C. for 18 hours.

The mixture was evaporated to near dryness under vacuum. Water (75 ml.) was added, followed by 50 ml. of concentrated hydrochloric acid. The resulting suspension was filtered and the solid cake was washed twice with 25-ml. portions of water. The combined filtrate and washings were adjusted to pH 9 with aqueous 50% sodium hydroxide solution. The solid which separated was removed by filtration and washed with water (25 ml.).

The combined filtrate and washings were extracted with 150-ml. portions of chloroform until 2 l. of chloroform had been used. The chloroform extracts were combined and dried over anhydrous sodium sulfate, and the solvent was evaporated under reduced pressure. The solid residue was recrystallized twice from acetonitrile to give 1,2-dihydro - 1-hydroxy-6-amino-4-(N-ethylmethallylamino)-2-imino-1,3,5-triazine.

Following the procedure of preparation 20, but substituting the 2,4-diamino-6-(N-ethylmethallylamino)-1,3, 5 - triazine by 2,4-diamino-6-(N-methylallylamino)-1,3,5-triazine; 2,4 - diamino - 6 - (N-isopropylallylamino)-1,3,5-triazine; 2,4 - diamino - 6 - (N-isobutylallylamino)-1,3,5-triazine; 2,4-diamino-6-(N-methyl-2-butenylamino)-1,3,5-triazine; 2,4-diamino-6-(N-butyl-2-butenylamino)-1,3,5-triazine; 2,4 - diamino-6-(N-methyl-4-pentenylamino)-1,3,5-triazine; 2,4-diamino-6-(N-methylmethallylamino)-1,3,5-triazine; 2,4 - diamino - 6 - (N-propylmethallylamino)-1,3,5-triazine; 2,4-diamino-6-(N-allyl-2-butenylamino)-1,3,5-triazine; and 2,4-diamino-6-(N-allylmethylamino)-1,3,5-triazine; there are obtained 1,2-dihydro-1-hydroxy-6-amino-4-(N-methylallylamino)-2-imino-1,3,5-triazine; 1,2 - dihydro - 1 - hydroxy - 6 - amino - 4 - (N-isopropylallylamino) - 2 - imino - 1,3,5 - triazine; 1,2-dihydro-1-hydroxy - 6 - amino - 4 - (N - isobutylallylamino) - 2-imino - 1,3,5 - triazine; 1,2 - dihydro - 1 - hydroxy - 6-amino - 4 - (N-methyl-2-butenylamino) - 2 - imino-1, 3,5 - triazine; 1,2 - dihydro - 1 - hydroxy 6 - amino - 4-(N-butyl-2-butenylamino) - 2 - imino - 1,3,5 - triazine; 1,2 - dihydro - 1 - hydroxy - 6 - amino - 4 - (N - methyl-4 - pentenylamino) - 2 - imino - 1,3,5 - triazine; 1,2 - dihydro - 1 - hydroxy - 6 - amino - 4 - (N - methylmethallylamino)-2-imino-1,3,5-triazine; 1,2-dihydro-1-hydroxy-6 - amino - 4 - (N - propylmethallylamino) - 2 - imino-1,3,5 - triazine; 1,2 - dihydro - 1 - hydroxy - 6 - amino - 4-(N - allyl - 2 - butenylamino) - 2 - imino - 1,3,5 - triazine; and 1,2 - dihydro - 1 - hydroxy - 6 - amino - 4 - (N - allylmethallylamino)-2-imino-1,3,5-triazine, respectively.

EXAMPLE 1

*Part A.—1,2-dihydro-1-allyloxy-6-amino-4-diallylamino-2-imino-1,3,5-triazine hydrochloride.*

A solution containing 2.2 g. of 1,2-dihydro-1-hydroxy-6-amino-4-diallylamino-1-imino-1,3,5-triazine and 3 g. of allyl chloride in 10 ml. of ethanol was allowed to stand at about 25° C. for 40 hours. At the end of that time, the above-discussed ferric chloride test was negative. The solvent was removed under reduced pressure and the residue was slurried in commercial hexanes, followed by filtration to give 2.0 g. of colorless solid having a melting point of 180 to 182° C. A mixed melt of the colorless solid with starting material melted at 160–175° C. Recrystallization of the colorless solid from acetonitrile gave 1,2 - dihydro - 1 - allyloxy-6-amino-4-diallylamino-2-imino-1,3,5-triazine hydrochloride; M.P. 185° C.

Analysis.—Calcd. for $C_{12}H_{19}N_6OCl$: C, 48.24; H, 6.41; N, 28.13; Cl, 11.87. Found: C, 47.88; H, 6.33; N, 27.34; Cl, 12.04.

U.V. ($H_2O$) 218 m$\mu$ (sh.) ($\epsilon$=17,700); 241 m$\mu$ ($\epsilon$=27,305). (0.01 N $H_2SO_4$) 216 m$\mu$ (sh.) ($\epsilon$=17,100); 240 m$\mu$ ($\epsilon$=27,200). 0.01 N NaOH) 231 m$\mu$ ($\epsilon$=28,200).

I.R. (principal bands; mineral oil mull) 3230, 3000, 1682, 1640, 1590, 1563, 1550, 1302, 1275 cm.$^{-1}$.

In like manner, substituting a stoichiometric equivalent amount of the other $R_4$ chlorides, and $R_4$ bromides and $R_4$ iodides, wherein $R_4$ is defined as above, for allyl chloride is productive of the corresponding hydrochlorides, hydrobromides, and hydroiodides of 1,2-dihydro-1-OR$_4$-6-amino-4-diallylamino-2-imino-1,3,5-triazine.

Part B.—*1,2-dihydro-1-allyloxy-6-amino-4-diallylamino-2-imino-1,3,5-triazine*

1,2 - dihydro - 1 - allyloxy - 6 -amino - 4 - diallylamino-2-imino-1,3,5-triazine hydrochloride was dissolved in water and treated with an excess of aqueous ammonia solution. The mixture was filtered, dried and crystallized from acetonitrile to give colorless 1,2-dihydro-1-allyloxy-6-amino-4-diallylamino-2-imino-1,3,5-triazine; M.P. 146–147° C.

*Analysis.*—Calcd. for $C_{12}H_{18}N_6O$: C, 54.94; H, 6.92; N, 32.04. Found: C, 54.88; H, 6.82; N, 31.51.

U.V. ($H_2O$) 218 m$\mu$ (sh.) ($\epsilon$=18,500); 240 m$\mu$ ($\epsilon$=27,050. (0.01 N $H_2SO_4$) 218 m$\mu$ (sh.) ($\epsilon$=17,700); 241 m$\mu$ ($\epsilon$=27,000). (0.01 N NaOH) 231 m$\mu$ ($\epsilon$=27,500).

I.R. (principal bands; mineral oil mull 3325, 3260, 3080, 3075, 1658, 1610, 1552, 1545, 1300, 1200, 1159 cm.$^{-1}$.

In like manner substituting other hydrochlorides, hydrobromides, and hydriodides of 1,2-dihydro-1-OR$_4$-6-amino-4-diallylamino-2-imino-1,3,5-triazine, wherein $R_4$ is defined as above, for 1,2-dihydro-1-allyloxy-6-amino-4-diallylamino-2-imino-1,3,5-triazine hydrochloride, is productive of the corresponding free base 1,2-dihydro-1-OR$_4$-6-amino-4-diallylamino-2-imino-1,3,5-triazine.

EXAMPLE 2

Part A.—*1,2-dihydro-1-methoxy-6-amino-4-diallylamino-2-imino-1,3,5-triazine hydriodide*

A solution of 2 g. of 1,2-dihydro-1-hydroxy-6-amino-4-diallylamino-2-imino-1,3,5-triazine and 6 g. of methyl iodide in 10 ml. of ethanol was allowed to stand at about 25° C. for 48 hours. The solvent was removed and the residue was crystallized from acetonitrile-ether to give 3.1 g. (95% yield) of 1,2-dihydro-1-methoxy-6-amino-4-diallylamino-2-imino-1,3,5-triazine hydriodide; M.P. 167–168° C. (dec.).

*Analysis.*—Calcd. for $C_{10}H_{17}N_6OI$: C, 32.98; H, 4.70; N, 23.08. Found: C, 33.10; H, 4.75; N, 22.59.

U.V. ($H_2O$) 229 m$\mu$ ($\epsilon$=34,850). (0.01 N $H_2O_4$) 229 m$\mu$ ($\epsilon$=35,000). (0.01 N NaOH) 228 m$\mu$ ($\epsilon$=40,250).

I.R. (principal bands; mineral oil mull) 3290, 3220, 3140, 1679, 1625, 1585, 1550, 1175, 675 cm.$^{-1}$.

Part B.—*1,2-dihydro-1-methoxy-6-amino-4-diallylamino-2-imino-1,3,5-triazine*

1,2 - dihydro - 1 - methoxy - 6 - amino - 4 - diallylamino-2-imino-1,3,5-triazine hydriodide was dissolved in water and treated with an excess of aqueous ammonia solution. The solid which separated was filtered, washed with water and recrystallized from water to give colorless 1,2 - dihydro - 1 - methoxy - 6 - amino - 4 - diallylamino-2-imino-1,3,5-triazine; M.P. 138–140° C.

*Analysis.*—Calcd. for $C_{10}H_{16}N_6O$: C, 50.83; H, 6.83. Found: C, 50.58; H, 7.00.

U.V. ($H_2O$) 216 m$\mu$ (sh.) ($\epsilon$=17,050); 238 m$\mu$ ($\epsilon$=25,600). (0.01 N $H_2SO_4$) 216 m$\mu$ ($\epsilon$=16,500); 240 m$\mu$ ($\epsilon$=25,600). (0.01 N NaOH) 231 m$\mu$ ($\epsilon$=26,450).

I.R. (principal bands; mineral oil mull) 3280, 3130, 1658, 1612, 1560, 1555, 1535, 1485, 1193, 1164, 755 cm.$^{-1}$.

EXAMPLE 3

Part A.—*1,2-dihydro-1-benzyloxy-6-amino-4-diallyl-amino-2-imino-1,3,5-triazine hydrochloride*

A solution of 5.56 g. of 1,2 - dihydro - 1-hydroxy-6-amino - 4 - diallylamino - 2 - imino - 1,3,5 - triazine and 6.33 g. of benzyl chloride in 150 ml. of absolute ethanol was stirred at about 25° C. until a ferric chloride test (discussed above) was found to be negative (70 hours). The reaction mixture was concentrated and the residual paste was treated with 100 ml. of absolute ethyl ether. The resulting solid was then filtered and washed with ether. The crude solid was dissolved in about 50 ml. of absolute ethanol, precipitated by the addition of 400 ml. absolute ether, filtered and washed with ether to yield 6.50 g. (74% yield) of white solid 1,2-dihydro-1-benzyloxy - 6 - amino - 4 - diallylamino - 2 - imino - 1,3,5-triazine hydrochloride; M.P. 193–194° C. (dec.) (sintered at 188° C.).

*Analysis.*—Calcd. for $C_{16}H_{21}ClN_6O$: C, 55.09; H, 6.07; Cl, 10.16; N, 24.09. Found: C, 55.29; H, 6.08; Cl, 10.12; N, 24.46.

U.V. (ethanol) 218 m$\mu$ ($\epsilon$=21,550); 243.5 m$\mu$ ($\epsilon$=29,900).

I.R. (principal bands; mineral oil mull) 3260, 3220, 3080, 1685, 1635, 1595, 1565, 1550, 1485, 1220, 1190, 1155, 1120, 1025, 775, 755, 700 cm.$^{-1}$.

Part B.—*1,2-dihydro-1-benzyloxy-6-amino-4-diallylamino-2-imino-1,3,5-triazine*

1,2-dihydro - 1 - benzyloxy - 6 - amino - 4 - diallylamino - 2 - imino - 1,3,5 - triazine hydrochloride is dissolved in water. To the thus-obtained solution there is then added an excess of aqueous ammonia solution. The solid 1,2 - dihydro - 1 - benzyloxy - 6 - amino - 4 - diallylamino - 2 - imino - 1,3,5 - triazine which separates is then filtered and dried.

EXAMPLE 4

Part A.—*1,2-dihydro-1-ethoxy-6-amino-4-diallylamino 2-imino-1,3,5-triazine hydriodide*

A solution of 5.56 g. of 1,2 - dihydro - 1 - hydroxy - 6-amino - 4 - diallylamino - 2 - imino - 1,3,5 - triazine and 7.80 g. of ethyl iodide was stirred at about 25° C. for 70 hours, then refluxed for 10 hours until a ferric chloride test (described above) was found to be negative. The resulting solid was then filtered, washed with ether, dissolved in about 50 ml. absolute alcohol, diluted with about 2 l. of ethyl ether, then filtered and washed with ether to yield 7.00 g. (74% yield) of off-white crystals of 1,2-dihydro - 1 - ethoxy - 6 - amino - 4 - diallylamino-2 - imino - 1,3,5 - triazine hydriodide; M.P. 166–169° C. (dec.).

*Analysis.*—Calcd. for $C_{11}H_{19}IN_6O$: C, 34.93; H, 5.06; I, 33.56; N, 22.22. Found: C, 35.37; H, 5.18; I, 33.17; N, 20.98.

U.V. (ethanol) 221 m$\mu$ ($\epsilon$=32,500); 235 m$\mu$ ($\epsilon$=30,750).

I.R. (principal bands; mineral oil mull) 3300, 3220, 3140, 1675, 1620, 1585, 1555, 1535, 1010 cm.$^{-1}$.

Part B.—*1,2-dihydro-1-ethoxy-6-amino-4-diallylamino-2-imino-1,3,5-triazine*

1,2 - dihydro - 1 - ethoxy - 6 - amino - 4 - diallylamino - 2 - imino - 1,3,5-triazine hydriodide is dissolved in water. To the thus-obtained solution there is then added an excess of aqueous ammonia solution. The solid 1,2 - dihydro - 1 - ethoxy - 6 - amino - 4 - diallylamino - 2 - imino - 1,3,5 - triazine which separates is then filtered and dried.

EXAMPLE 5

Part A.—*1,2-dihydro-1-(2-propynyloxy)-6-amino-4-diallylamino-2-imino-1,3,5-triazine hydrobromide*

A solution of 5.56 g. of 1,2 - dihydro - 1 - hydroxy-6-amino - 4 - diallylamino - 2 - imino - 1,3,5 - triazine and 5.95 g. of propargyl bromide in 150 ml. of absolute ethanol was stirred at about 25° C. until a ferric chloride test (discussed above) was found to be negative (70 hours). The reaction mixture was concentrated and the residual paste was treated with 100 ml. of absolute ether. The resulting solid was then filtered, washed with ether and dissolved in about 50 ml. of absolute alcohol. The solution was diluted with 2 l. of absolute ether, and the solid was filtered and washed with ether to yield 6.40 g. (75% yield) of white solid 1,2 - dihydro - 1- (2 - propynyloxy) - 6 - amino - 4 - diallylamino - 2-imino - 1,3,5 - triazine hydrobromide; M.P. 160° C. (dec.).

Analysis.—Calcd. for $C_{12}H_{17}BrN_6O$: C, 42.24; H, 5.02; Br, 23.42; N, 24.63. Found: C, 41.99; H, 5.18; Br, 22.98; N, 23.77.

U.V. ($H_2O$) 241 m$\mu$ ($\epsilon$=25,950). (0.01 N $H_2SO_4$) 241 m$\mu$ ($\epsilon$=28,100). (0.01 N NaOH) 230 m$\mu$ ($\epsilon$=30,450)

I.R. (principal bands; mineral oil mull) 3300, 3250, 3100, 1680, 1630, 1560, 1545, 1020 cm.$^{-1}$.

Part B.—1,2-dihydro-1-(2-propynyloxy)-6-amino-4-diallylamino-2-imino-1,3,5-triazine 1,2 - dihydro - 1 - (2 - propynyloxy)-6-amino-4-diallyl-amino-2-imino-1,3,5-triazine hydrobromide is dissolved in water. To the thus-obtained solution there is then added an excess of aqueous ammonia solution. The solid 1,2-di-hydro-1-(2-propynyloxy) - 6 - amino - 4 - diallylamino-2-imino-1,3,5-triazine which separates is then filtered and dried.

EXAMPLE 6

Part A

Similarly substituting other starting materials, such as those named in preparations 1–20, for example, 1,2-dihydro-1-hydroxy-6-amino-4-dimethylamino-2-imino-1,3,5-triazine,
1,2-dihydro-1-hydroxy-6-amino-4-dipropylamino-2-imino-1,3,5-triazine,
1,2-dihydro-1-hydroxy-6-amino-4-dibutylamino-2-imino-1,3,5-triazine,
1,2-dihydro-1-hydroxy-6-amino-4-[bis(1-methylallyl)-amino]-2-imino,1,3,5-triazine,
1,2-dihydro-1-hydroxy-6-amino-4-di-sec-butylamino-2-imino-1,3,5-triazine,
1,2-dihydro-1-hydroxy-6-amino-4-[bis(1,5-dimethyl-hexyl)-amino]-2-imino-1,3,5-triazine,
1,2-dihydro-1-hydroxy-6-amino-4-(1-pyrrolidinyl)-2-imino-1,3,5-triazine,
1,2-dihydro-1-hydroxy-6-amino-4-(1-aziridinyl)-2-imino-1,3,5-triazine,
1,2-dihydro-1-hydroxy-6-amino-4-piperidino-2-imino-1,3,5-triazine,
1,2-dihydro-1-hydroxy-6-amino-4-(1-hexahydroazepinyl)-2-imino-1,3,5-triazine,
1,2-dihydro-1-hydroxy-6-amino-4-(1-azetidinyl)-2-imino-1,3,5-triazine,
1,2-dihydro-1-hydroxy-6-amino-4-(1-heptamethyl-enimino)-2-imino-1,3,5-triazine
1,2-dihydro-1-hydroxy-6-amino-4-(1-octamethyl-enimino)-2-imino-1,3,5-triazine
1,2,-dihydro-1-hydroxy-6-amino-4-(2,6-dimethyl-morpholino)-2-imino-1,3,5-triazine,
1,2-dihydro-1-hydroxy-6-amino-4-morpholino-2-imino-1,3,5-triazine,
1,2-dihydro-1-hydroxy-6-methylamino-4-piperidino-2-methylimino-1,3,5-triazine,
1,2-dihydro-1-hydroxy-6-amino-4-dibenzylamino-2-imino-1,3,5-triazine,
1,2-dihydro-1-hydroxy-4,6-dipiperidino-2-methyl-imino-1,3,5-triazine,
1,2,-dihydro-1-hydroxy-6-amino-4-(N-methylallyl-amino)-2-imino-1,3,5-triazine,
1,2-dihydro-1-hydroxy-6-amino-4-(N-ethylmethallyl-amino)-2-imino-1,3,5-triazine,
1,2-dihydro-1-hydroxy-6-allylamino-4-diallylamino-2-imino-1,3,5-triazine, and 1,2-dihydro-1-hydroxy-6-amino-4-allylamino-2-imino-1,3,5-triazine, and the like, for 1,2-dihydro-1-hydroxy-6-amino-4-diallyl-amino-2-imino-1,3,5-triazine, and following the procedure of Example 1, part A is productive of the corresponding etherified 1,3,5-triazine hydrochlorides, for example, 1,2-dihydro-1-allyloxy-6-amino-4-dimethylamino-2-imino-1,3,5-triazine hydrochloride,
1,2-dihydro-1-allyloxy-6-amino-4-dipropylamino-2-imino-1,3,5-triazine hydrochloride,
1,2-dihydro-1-allyloxy-6-amino-4-dibutylamino-2-imino-1,3,5-triazine hydrochloride,
1,2-dihydro-1-allyloxy-6-amino-4-[bis(1-methylallyl) amino]-2-imino-1,3,5-triazine hydrochloride,
1,2-dihydro-1-allyloxy-6-amino-4-di-sec-butylamino-2-imino-1,3,5-triazine hydrochloride,
1,2-dihydro-1-allyloxy-6-amino-4-[bis(1,5-dimethyl-hexyl)-amino]-2-imino-1,3,5-triazine hydrochloride,
1,2-dihydro-1-allyloxy-6-amino-4-(1-pyrrolidinyl)-2-
1,2-dihydro-1-allyloxy-6-amino-4-(1-aziridinyl)-2-imino-1,3,5-triazine hydrochloride,
1,2-dihydro-1-allyloxy-6-amino-4-piperidino-2-imino-1,3,5-triazine hydrochloride,
1,2-dihydro-1-allyloxy-6-amino-4-(1-hexahydroazepinyl)-2-imino-1,3,5-triazine hydrochloride,
1,2-dihydro-1-allyloxy-6-amino-4-(1-azetidinyl)-2-imino-1,3,5-triazine hydrochloride,
1,2-dihydro-1-allyloxy-6-amino-4-(1-heptamethyl-enimino)-2-imino-1,3,5-triazine hydrochloride,
1,2-dihydro-1-allyloxy-6-amino-4-(1-octamethyl-enimino)-2-imino-1,3,5-triazine hydrochloride,
1,2-dihydro-1-allyloxy-6-amino-4-(2,6-dimethylmor-pholino)-2-imino-1,3,5-triazine hydrochloride,
1,2-dihydro-1-allyloxy-6-amino-4-morpholino-2-imino-1,3,5-triazine hydrochloride,
1,2-dihydro-1-allyloxy-6-methylamino-4-piperidino-2-methylimino-1,3,5-triazine hydrochloride,
1,2-dihydro-1-allyloxy-6-amino-4-dibenzylamino-2-imino-1,3,5-triazine hydrochloride,
1,2-dihydro-1-allyloxy-4,6-dipiperidino-2-methylimino-1,3,5-triazine hydrochloride,
1,2-dihydro-1-allyloxy-6-amino-4-(N-methylallylamino)-2-imino-1,3,5-triazine hydrochloride,
1,2-dihydro-1-allyloxy-6-amino-4-(N-ethylmethallyl-amino)-2-imino-1,3,5-triazine hydrochloride,
1,2-dihydro-1-allyloxy-6-allylamino-4-diallylamino-2-imino-1,3,5-triazine hydrochloride,
1,2-dihydro-1-allyloxy-6-amino-4-allylamino-2-imino-1,3,5-triazine hydrochloride, and the like.

Similarly, substituting other organic halides, namely, those of the formula $R_4Cl$, $R_4Br$, $R_4I$, wherein $R_4$ is defined as above, for the allyl chloride of Example 1, part A, and using as starting materials those compounds named in preparations 1–20, there are obtained the corresponding etherified 1,3,5-triazine hydrohalides, for example, 1,2 - dihydro-1-$OR_4$-1,3,5-triazine hydrochlorides, 1,2-dihydro-1-$OR_4$-1,3,5-triazine hydrobromides, and 1,2-dihydro-1-$OR_4$-1,3,5-triazine hydriodides, in which $R_4$ has the meaning given above.

Part B

Similarly, the free base form of the compounds described in Examples 1–6, parts A, are obtained by treating the hydrohalides, e.g., the hydrochlorides, the hydrobromides, and the hydriodides, set out therein with an excess of aqueous ammonia. Exemplary of the compounds thus obtained are:

1,2-dihydro-1-allyloxy-6-amino-4-dimethylamino-2-imino-1,3,5-triazine,
1,2-dihydro-1-allyloxy-6-amino-4-dipropylamino-2-imino-1,3,5-triazine,
1,2-dihydro-1-allyloxy-6-amino-4-dibutylamino-2-imino-1,3,5-triazine, 1,2-dihydro-1-allyloxy-6-amino-4-[bis(1-methylallyl)amino]-2-imino-1,3,5-triazine, 1,2-dihydro-1-allyloxy-6-amino-4-di-sec-butylamino-2-imino-1,3,5-triazine, 1,2-dihydro-1-allyloxy-6-amino-4-[bis(1,5-dimethylhexyl)-amino]-2-imino-1,3,5-triazine, 1,2-dihydro-1-allyloxy-6-amino-4-(1-pyrroldinyl)-2-imino-1,3,5-triazine, 1,2-dihydro-1-allyloxy-6-amino-4-(1-aziridinyl)-2-imino-1,3,5-triazine, 1,2-dihydro-1-allyloxy-6-amino-4-piperidino-2-imino-1,3,5-triazine, 1,2-dihydro-1-allyloxy-6-amino-4-(1-hexahydroazepinyl)-2-imino-1,3,5-triazine, 1,2-dihydro-1-allyloxy-6-amino-4-(1-azetidinyl)-2-imino-1,3,5-triazine, 1,2-dihydro-1-allyloxy-6-amino-4-(1-heptamethylenimino)-2-imino-1,3,5-triazine, 1,2-dihydro-1-allyloxy-6-amino-4-(1-octamethylenimino)-2-imino-1,3,5-triazine, 1,2-dihydro-1-allyloxy-6-amino-4-(2,6-dimethylmorpholino)-2-imino-1,3,5-triazine, 1,2-dihydro-1-allyloxy-6-amino-4-morpholino-2-imino-1,3,5-triazine, 1,2-dihydro-1-allyloxy-6-methylamino-4-piperidino-2-methylimino-1,3,5-triazine, 1,2-dihydro-1-allyloxy-6-amino-4-dibenzylamino-2-imino-1,3,5-triazine, 1,2-dihydro-1-allyloxy-4,6-dipiperidino-2-methylimino-1,3,5-triazine, 1,2-dihydro-1-allyloxy-6-amino-4-(N-methylallylamino)-2-imino-1,3,5-triazine, 1,2-dihydro-1-allyloxy-6-amino-4-(N-ethylmethallylamino)-2-imino-1,3,5-triazine, 1,2-dihydro-1-allyloxy-6-allylamino-4-diallylamino-2-imino-1,3,5-triazine, 1,2-dihydro-1-allyloxy-6-amino-4-allylamino-2-imino-1,3,5-triazine, and the like.

EXAMLPE 7

Treatment of the free bases, described in Examples 1–6, parts B, with a suitable acid, for example, hydrochloric, hydrobromic, sulfuric, phosphoric, nitric, acetic, benzoic, salicylic, glycolic, succinic, nicotinic, tartaric, maleic, malic, pamoic, methanesulfonic, cyclohexanesulfamic and lactic acids, is productive of the corresponding acid addition salt. For example:

(1) 1,2 - dihydro - 1-allyloxy-6-amino-4-diallylamino-2-imino-1,3,5-triazine is converted to the corresponding sulfuric acid addition salt by adding one equivalent of sulfuric acid to an absolute ethanol solution of the free base followed by addition of several volumes of ether to precipitate the salt.

(2) 1,2 - dihydro - 1-methoxy-6-amino-4-diallylamino-2-imino-1,3,5-triazine is converted to the corresponding hydrochloride by addition of excess hydrochloric acid to the free base followed by evaporation of the water.

(3) 1,2 - dihydro-1-benzyloxy-6-amino-4-diallylamino-2-imino-1,3,5-triazine is converted to the corresponding benzoic acid salt by adding one equivalent of benzoic acid to an absolute ethanol solution of the free base, followed by addition of several volumes of diethyl ether.

(4) 1,2 - dihydro - 1-ethoxy-6-amino-4-diallylamino-2-imino-1,3,5-triazine is converted to the corresponding phosphoric acid salt by adding one equivalent of phosphoric acid to an absolute ethanol solution of free base followed by addition of several volumes of diethyl ether.

(5) 1,2 - dihydro-1-(2-propynyloxy)-6-amino-4-diallylamino-2-imino-1,3,5-triazine is converted to the corresponding lactic acid addition salt by adding one equivalent of lactic acid to an absolute ethanol solution of free base followed by addition of several volumes of diethyl ether.

(6) 1,2 - dihydro - 1-allyloxy-6-amino-4-dimethylamino-2-imino-1,3,5-triazine is converted to the corresponding salicylic acid addition salt by adding one equivalent of salicylic acid to an absolute ethanol solution of the free base followed by addition of several volumes of diethyl ether.

(7) A solution of 1,2-dihydro-1-allyloxy-6-amino-4-dipropylamino-2-imino-1,3,5-triazine in water containing one equivalent of hydrochloric acid (about 1% hydrochloric acid) gives the monohydrochloride when evaporated to dryness. Similar use of 2 equivalents of hydrochloric acid gives the dihydrochloride. Similar use of one molecular amount of sulfuric acid gives the monosulfuric acid addition salt.

I claim:

1. A compound selected from the group consisting of the free base form and acid addition salts of a compound of the formula:

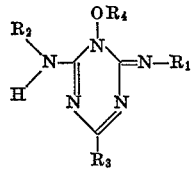

wherein $R_1$ and $R_2$ are selected from the group consisting of hydrogen and alkyl of 1 to 4 carbon atoms, inclusive, $R_3$ is selected from the group consisting of di-lower-alkylamino, N-lower-alkyl-lower-alkenylamino, di-lower-alkenylamino, and the heterocyclic moieties, aziridinyl, azetidinyl, pyrrolidinyl, piperidino, hexahydroazepinyl, heptamethylenimino, octamethylenimino, and morpholino, each of said heterocyclic moieties having attached as substituents on carbon atoms thereof zero to 3 alkyls, inclusive, each substituent alkyl being of 1 to 8 carbon atoms, inclusive, the nitrogen atom of $R_3$ being the point of attachment of $R_3$ to the ring in said formula, and $R_4$ is selected from the group consisting of lower alkyl, lower alkenyl, lower alkynyl, lower cycloalkyl, lower aralkyl, lower alkaralkyl, lower alkoxyaralkyl, and lower haloaralkyl.

2. A compound selected from the group consisting of the free base form and acid addition salts of a compound of the formula:

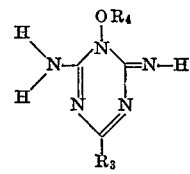

wherein $R_3$ is selected from the group consisting of di-lower-alkylamino, N-lower-alkyl-lower-alkenylamino, di-lower-alkenylamino, and the heterocyclic moieties, aziridinyl, azetidinyl, pyrrolidinyl, piperidino, hexahydroazepinyl, heptamethylenimino, octamethylenimino, and morpholino, each of said heterocyclic moieties having attached as substituents on carbon atoms thereof zero to 3 alkyls, inclusive, each substituent alkyl being of 1 to 8 carbon atoms, inclusive, the nitrogen atom of $R_3$ being the point of attachment of $R_3$ to the ring in said formula, and $R_4$ is selected from the group consisting of lower alkyl, lower alkenyl, lower alkynyl, lower cycloalkyl, lower aralkyl, lower alkaralkyl, lower alkoxyaralkyl, and lower haloaralkyl.

3. A compound selected from the group consisting of the free base form and acid addition salts of a compound of the formula:

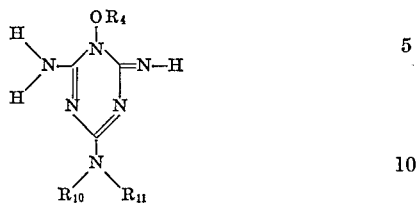

wherein $R_4$ is selected from the group consisting of lower alkyl, lower alkenyl, lower alkynyl, lower cycloalkyl, lower aralkyl, lower alkaralkyl, lower alkoxyaralkyl, and lower haloaralkyl, and $R_{10}$ and $R_{11}$ are lower alkenyl.

4. 1,2 - dihydro - 1 - allyloxy-6-amino-4-diallylamino-2-imino-1,3,5-triazine, the free base of the formula of claim 3 where $R_4$, $R_{10}$ and $R_{11}$ are allyl.

5. 1,2 - dihydro - 1 - allyloxy-6-amino-4-diallylamino-2-imino-1,3,5-triazine hydrochloride, the hydrochloride of the free base of the formula of claim 3 where $R_4$, $R_{10}$ and $R_{11}$ are allyl.

6. 1,2-dihydro - 1 - methoxy-6-amino-4-diallylamino-2-imino-1,3,5-triazine, the free base of the formula of claim 3 where $R_4$ is methyl and $R_{10}$ and $R_{11}$ are allyl.

7. 1,2-dihydro - 1 - methoxy-6-amino-4-diallylamino-2-imino-1,3,5-triazine hydriodide, the hydriodide of the free base of the formula of claim 3 where $R_4$ is methyl and $R_{10}$ and $R_{11}$ are allyl.

8. 1,2-dihydro - 1 - benzyloxy-6-amino-4-diallylamino-2-imino-1,3,5-triazine, the free base of the formula of claim 3 where $R_4$ is benzyl and $R_{10}$ and $R_{11}$ are allyl.

9. 1,2-dihydro - 1 - benzyloxy-6-amino-4-diallylamino-2-imino-1,3,5-triazine hydrochloride, the hydrochloride of the free base of the formula of claim 3 where $R_4$ is benzyl and $R_{10}$ and $R_{11}$ are allyl.

10. 1,2 - dihydro - 1 - ethoxy-6-amino-4-diallylamino-2-imino-1,3,5-triazine, the free base of the formula of claim 3 where $R_4$ is ethyl and $R_{10}$ and $R_{11}$ are allyl.

11. 1,2 - dihydro - 1 - ethoxy-6-amino-4-diallylamino-2-imino-1,3,5-triazine hydriodide, the hydriodide of the free base of the formula of claim 3 where $R_4$ is ethyl and $R_{10}$ and $R_{11}$ are allyl.

12. 1,2-dihydro - 1 - (2-propynyloxy)-6-amino-4-diallylamino-2-imino-1,3,5-triazine, the free base of the formula of claim 3 where $R_4$ is 2-propynyl and $R_{10}$ and $R_{11}$ are allyl.

13. 1,2-dihydro - 1 - (2-propynyloxy)-6-amino-4-diallylamino-2-imino-1,3,5-triazine hydrobromide, the hydrobromide of the free base of the formula of claim 3 where $R_4$ is 2-propynyl and $R_{10}$ and $R_{11}$ are allyl.

14. A process for producing a 1,3,5-triazine ether of the formula:

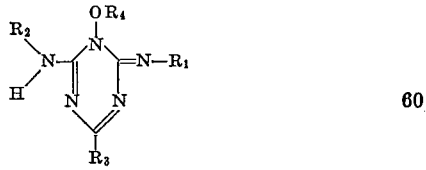

wherein $R_1$ and $R_2$ are selected from the group consisting of hydrogen and alkyl of 1 to 4 carbon atoms, inclusive, $R_3$ is selected from the group consisting of di-lower-alkylamino, N-lower-alkyl-lower-alkenylamino, di-lower alkenylamino, and the heterocyclic moieties, aziridinyl, azetidinyl, pyrrolidinyl, piperidino, hexahydroazepinyl, heptamethylenimino, octamethylenimino, and morpholino, each of said heterocyclic moieties having attached as substituents on carbon atoms thereof zero to 3 alkyl, inclusive, each substituent alkyl being of 1 to 8 carbon atoms, inclusive, the nitrogen atom of $R_3$ being the point of attachment of $R_3$ to the ring in said formula, and $R_4$ is selected from the group consisting of lower alkyl, lower alkenyl, lower alkynyl, lower cycloalkyl, lower aralkyl, lower alkaralkyl, lower alkoxyaralkyl, and lower haloaralkyl, which comprises mixing a triazine of the formula:

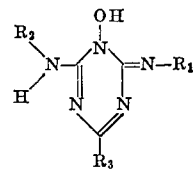

wherein $R_1$, $R_2$, and $R_3$ are as given above, with an organic halide of the formula, $R_4$—X, wherein $R_4$ is as given above and X is selected from the group consisting of chloride, bromide, and iodide, to form said 1,3,5-triazine ether.

References Cited

UNITED STATES PATENTS 3,270,014 8/1966 Ursprung et al. __ 260—249.6 XR
3,293,247 12/1966 Duennenberger et al. __ 260—248

OTHER REFERENCES

Fuson: "Reactions of Organic Compounds," Wiley and Sons, Inc., New York (1962), pp. 284–5.

McKay et al.: Canadian Jour. Chem., vol. 38, pp. 343–6 (1960).

HENRY R. JILES, Primary Examiner

J. M. FORD, Assistant Examiner

U.S. Cl. X.R.

260—247.1, 247.5, 249.8, 465.5, 502, 999